E. C. SCHINKE AND N. A. SUTHERLAND.
CALCULATING MACHINE.
APPLICATION FILED JULY 29, 1918. RENEWED APR. 5, 1920.
1,358,114.
Patented Nov. 9, 1920.
15 SHEETS—SHEET 10.
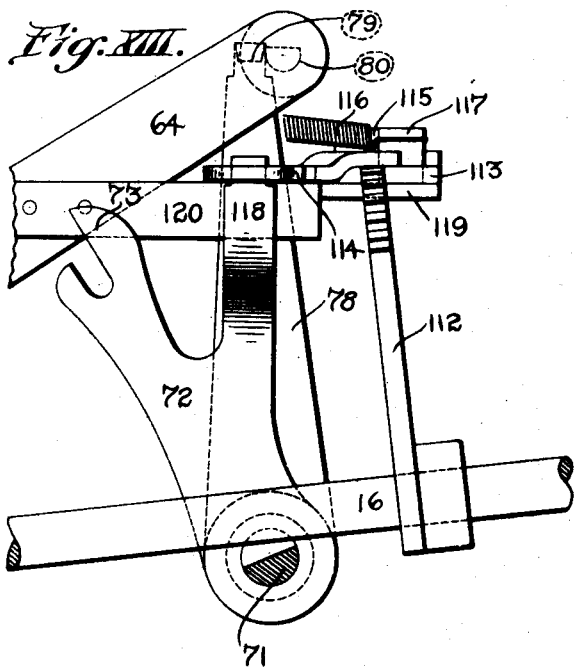
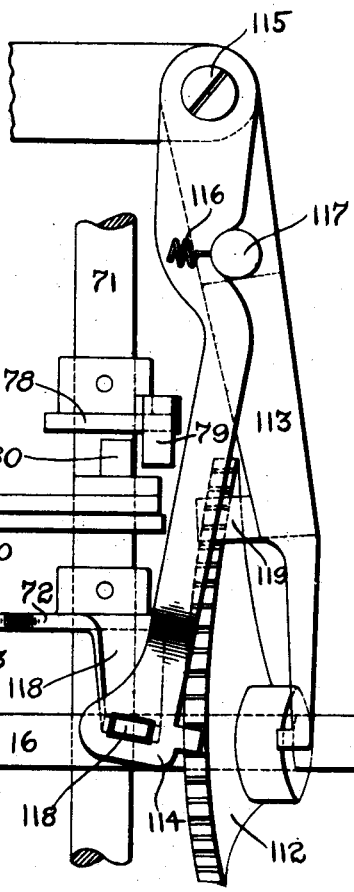
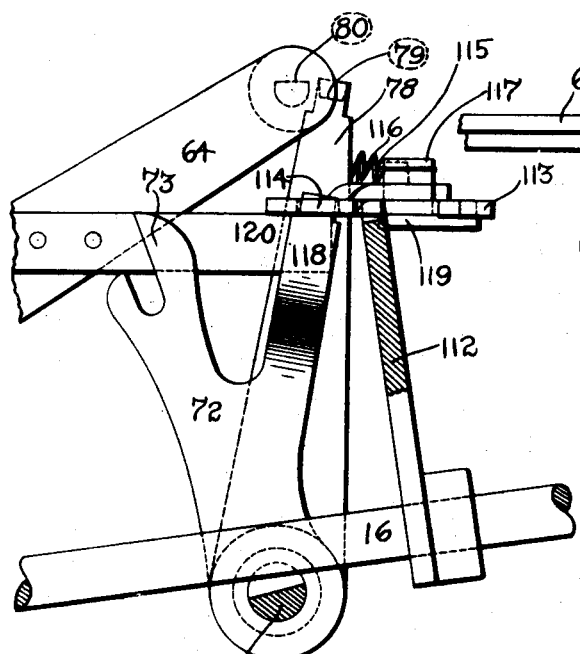

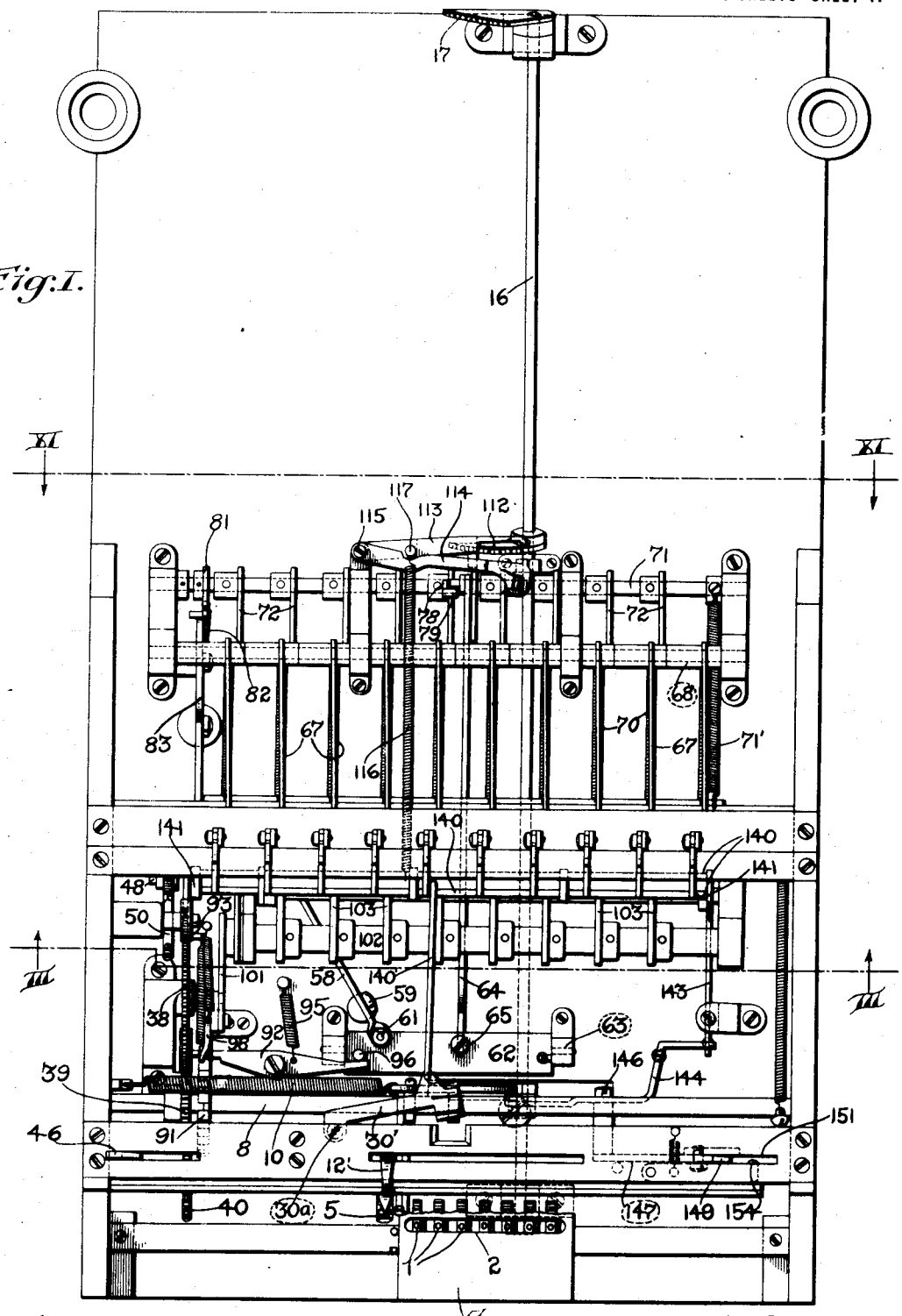

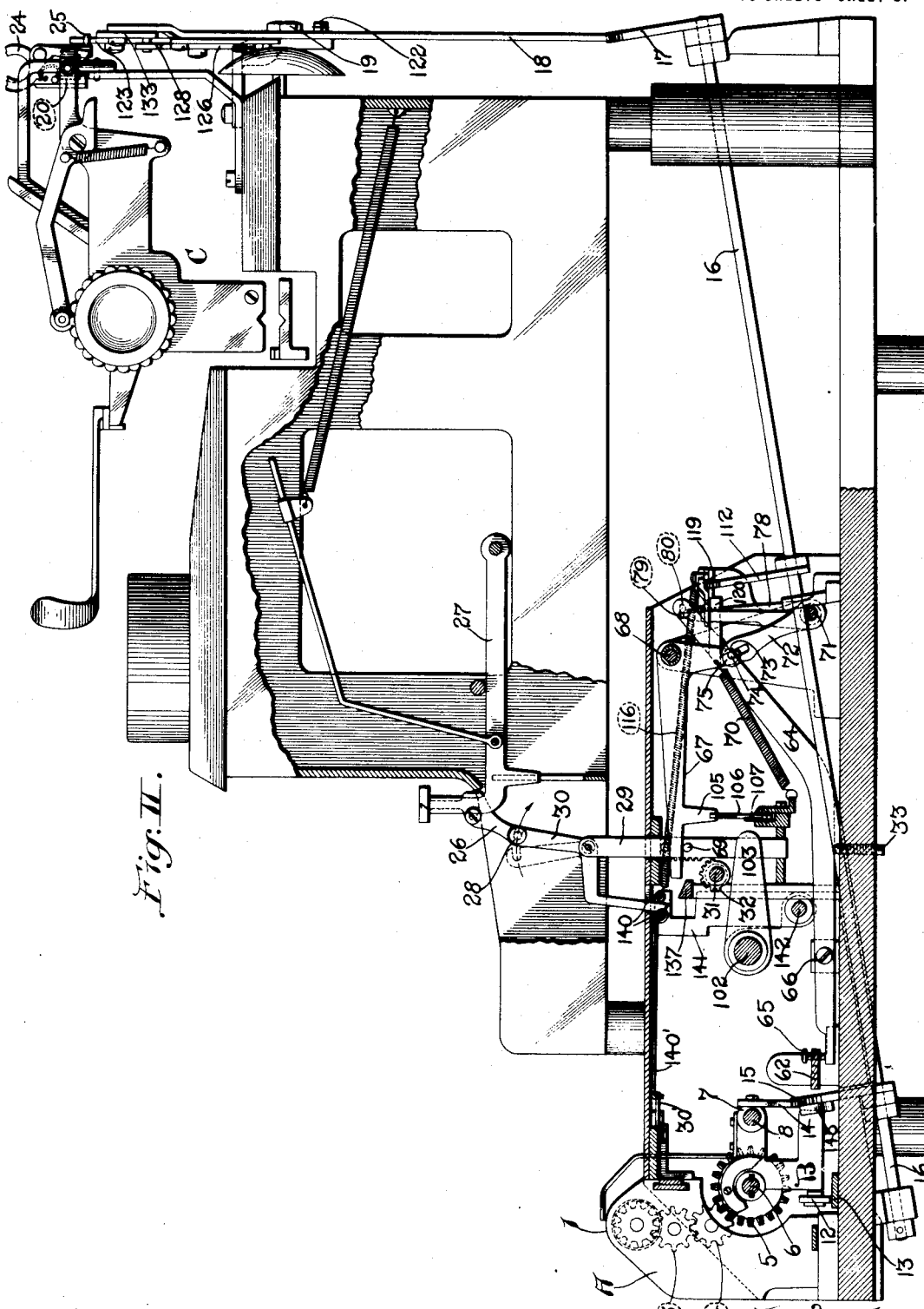

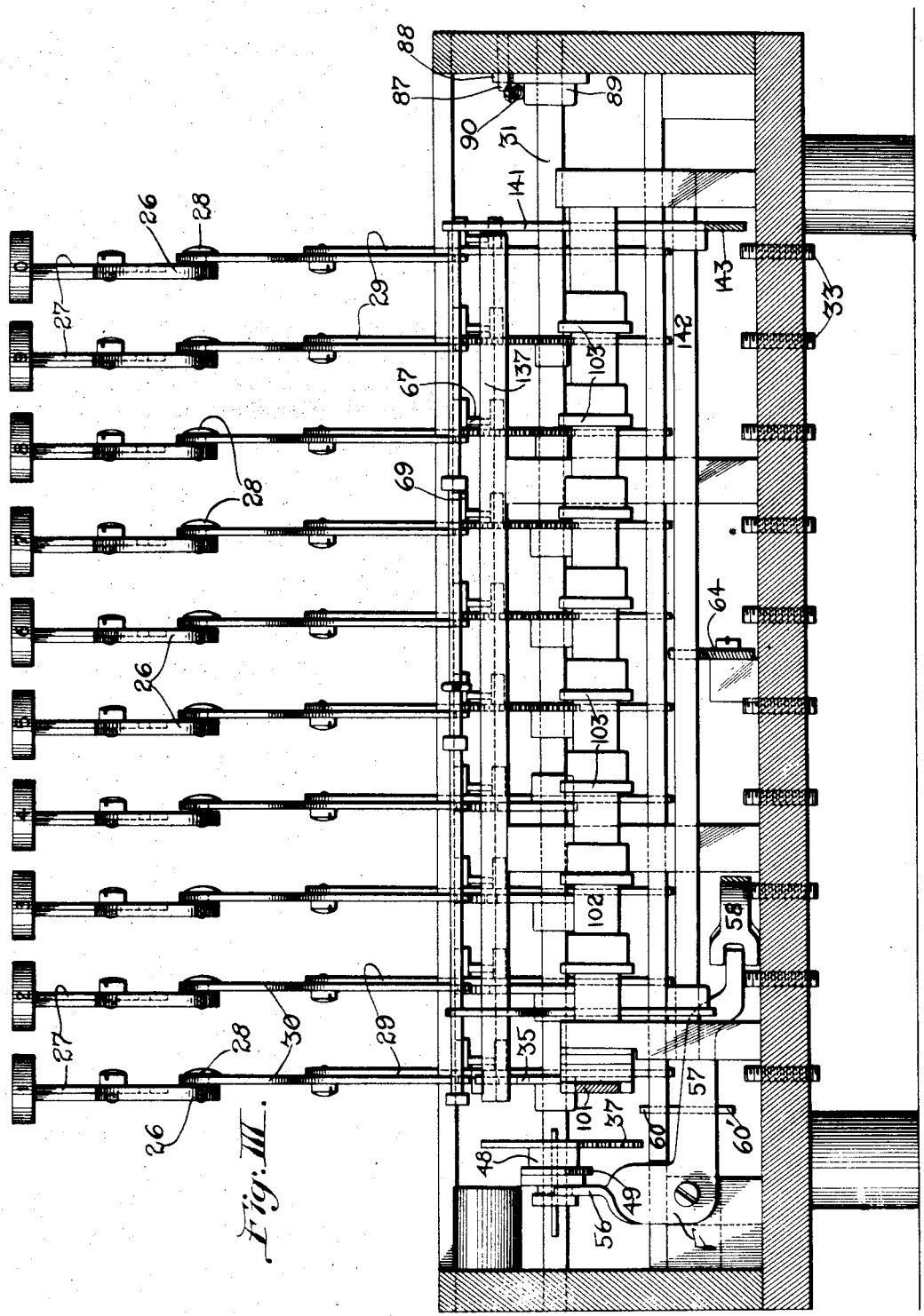

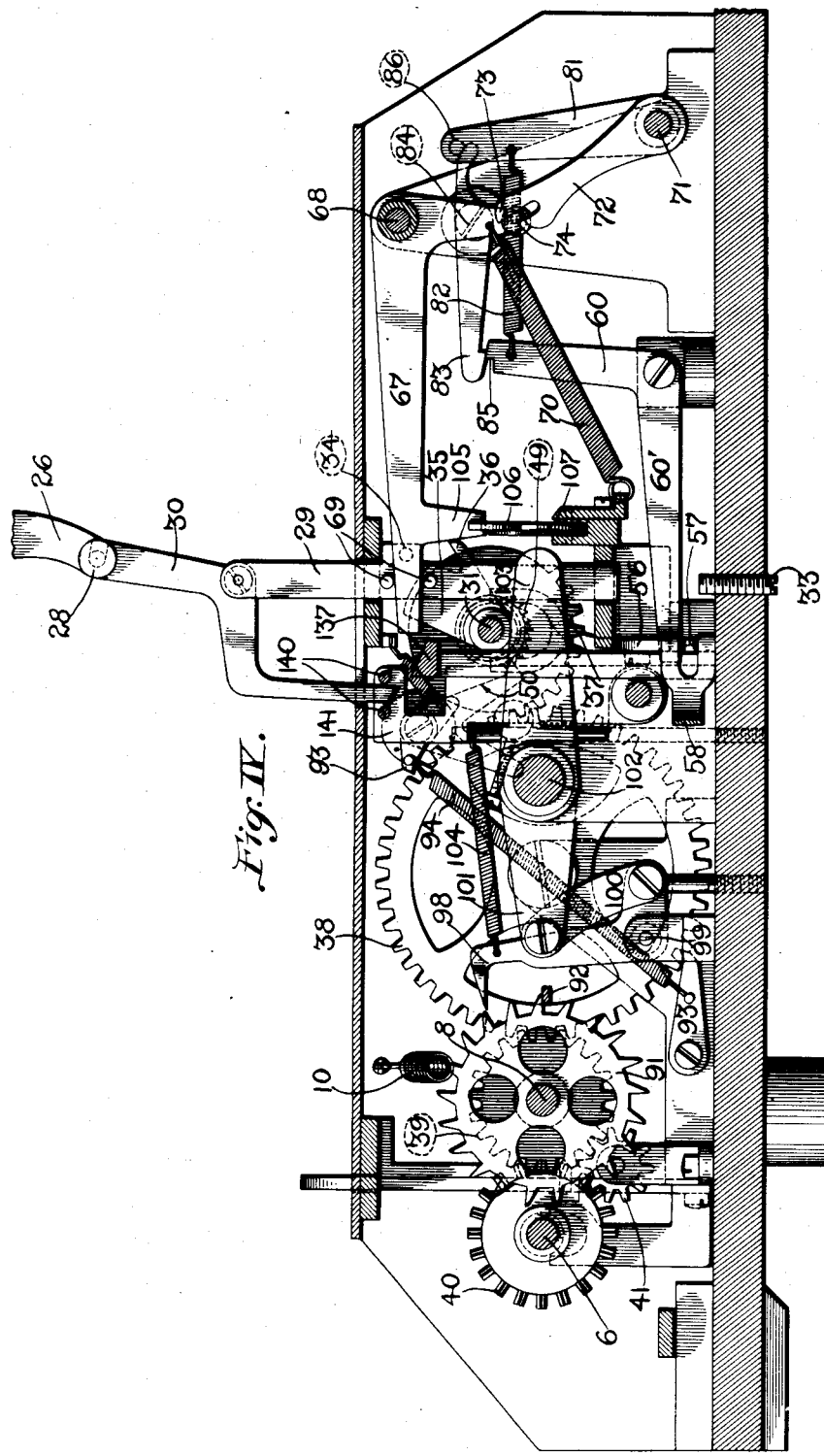

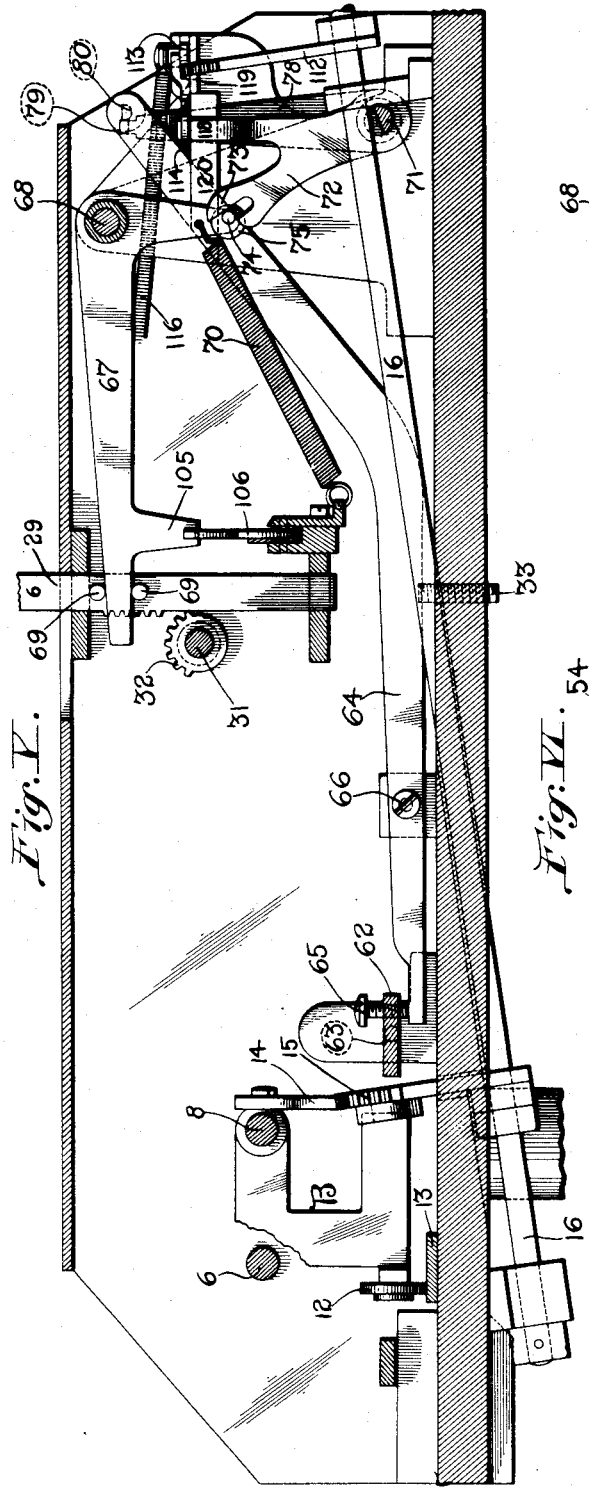
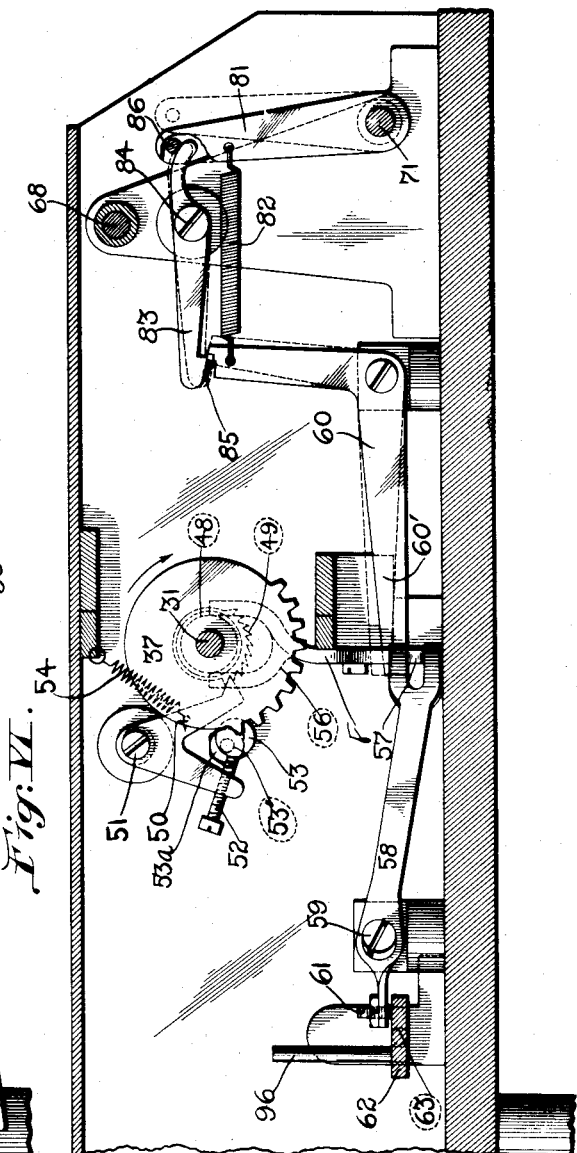
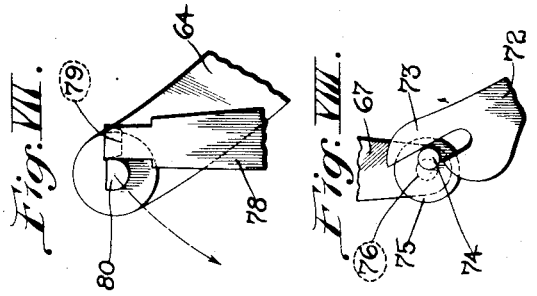

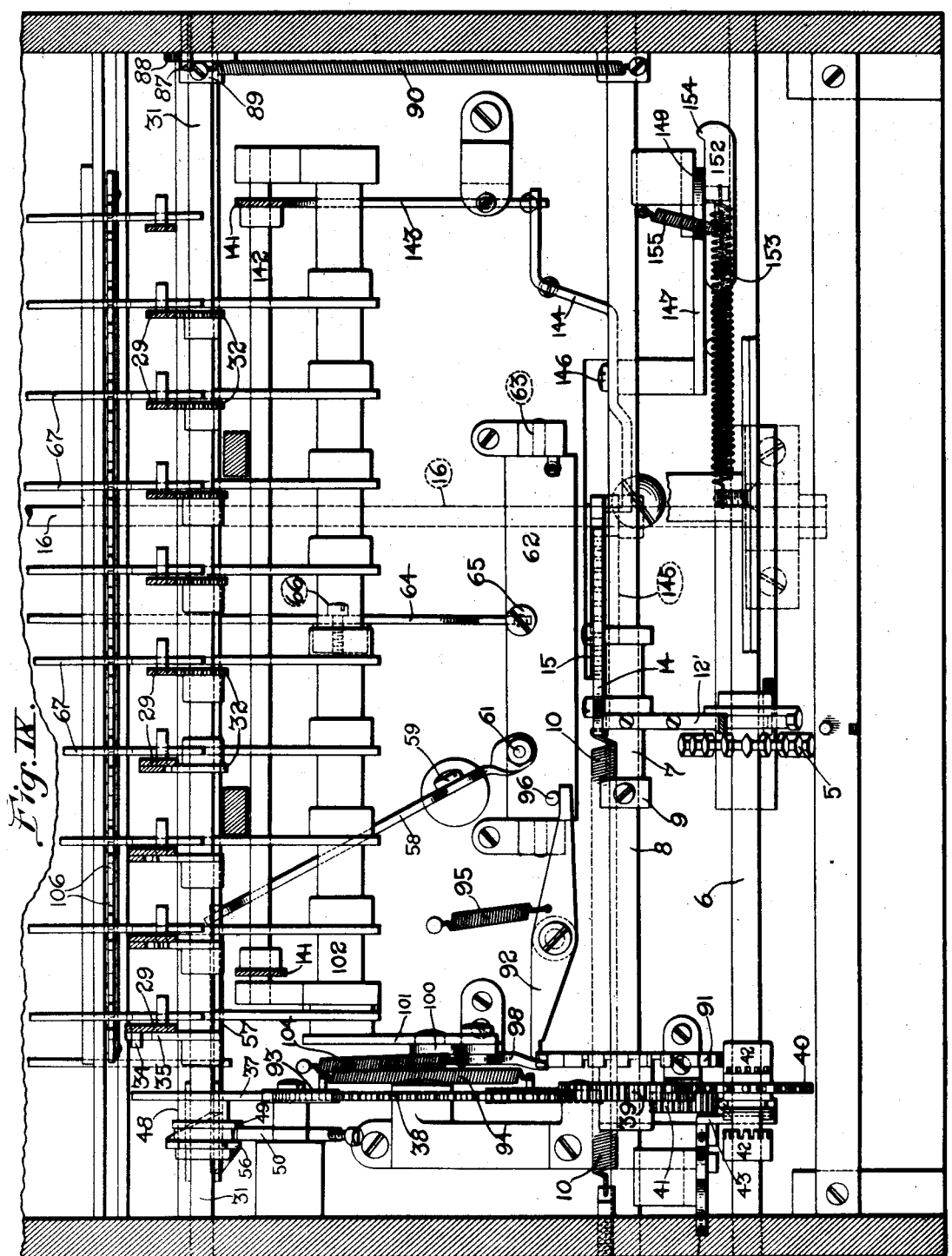

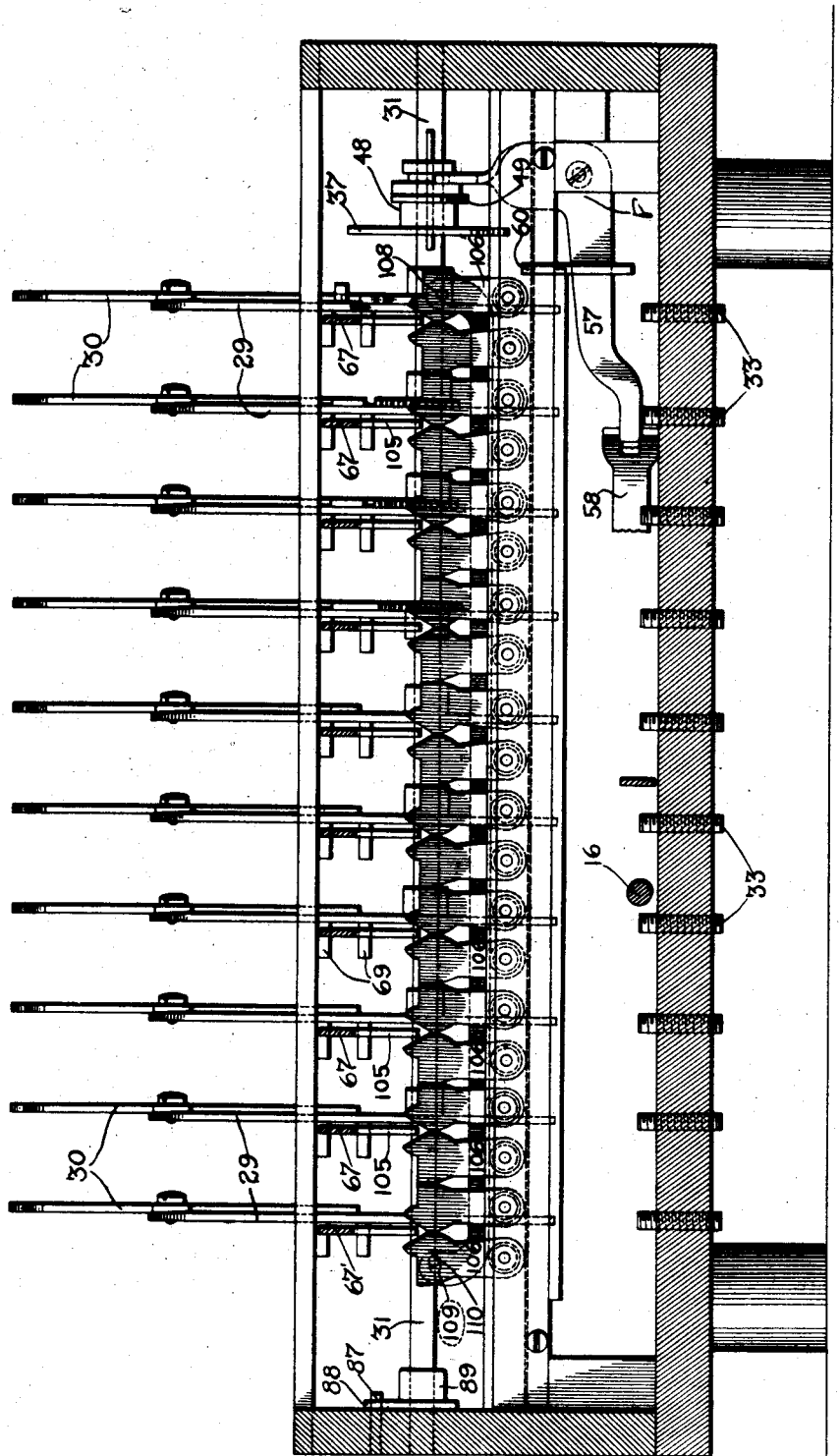

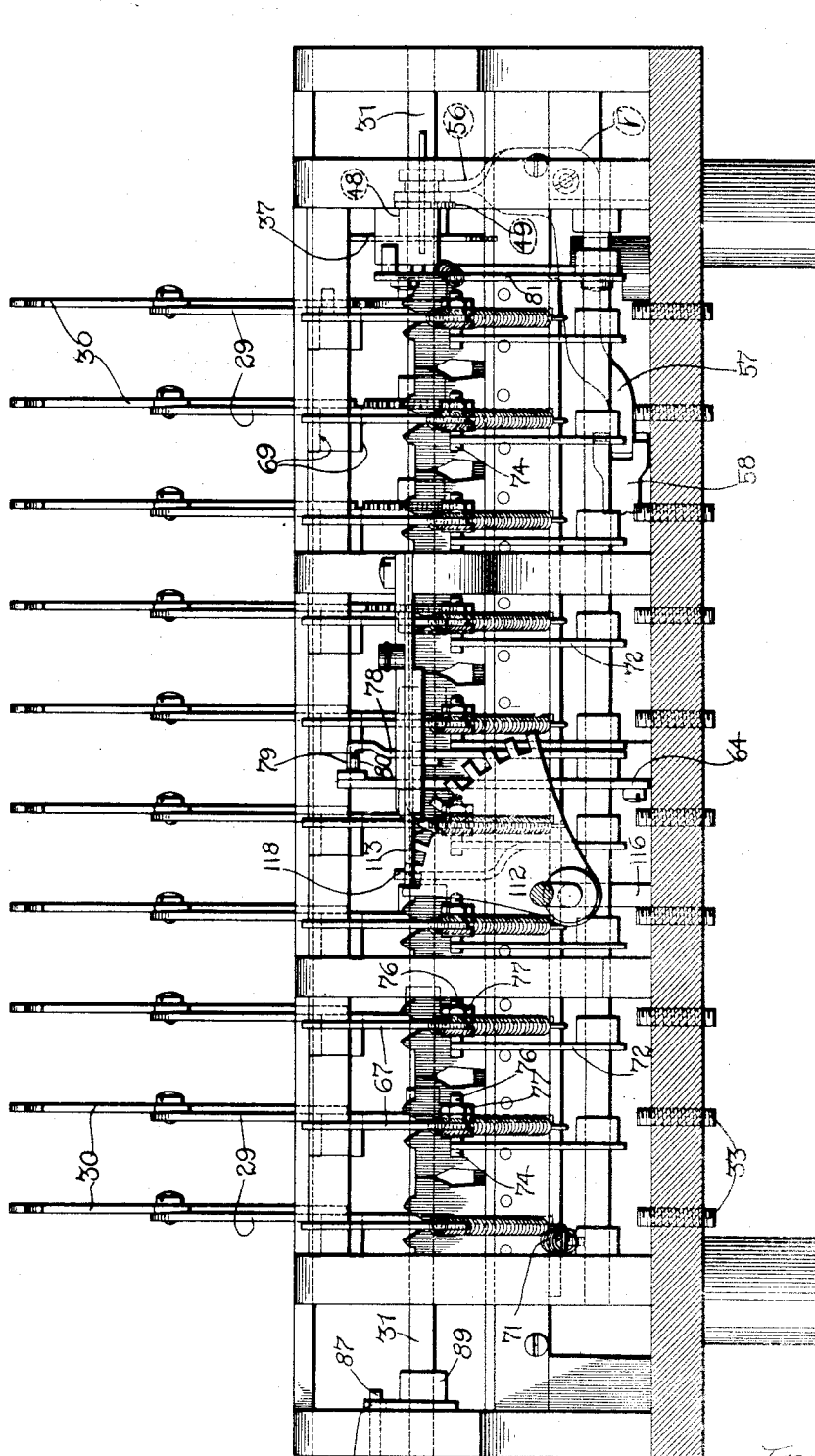

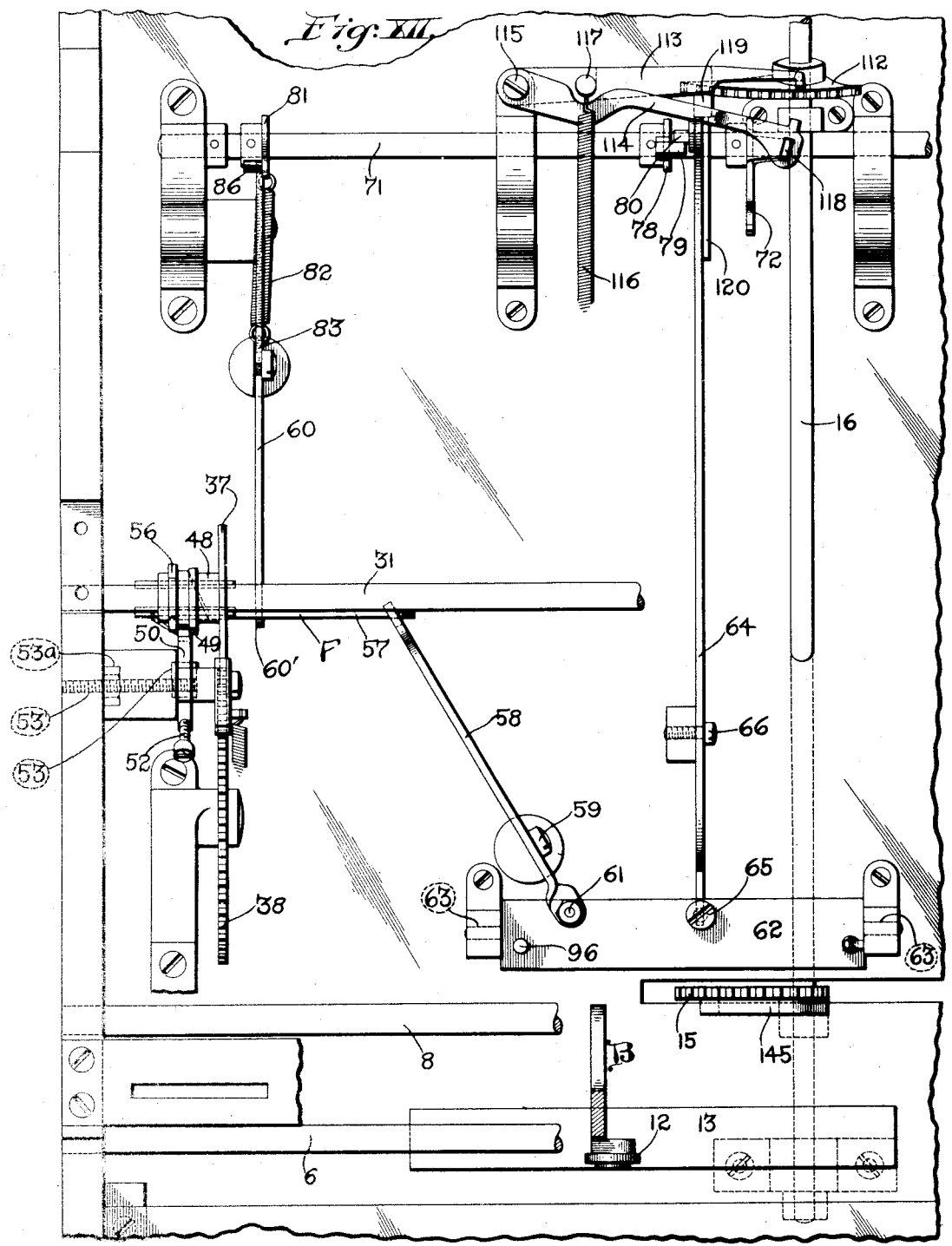

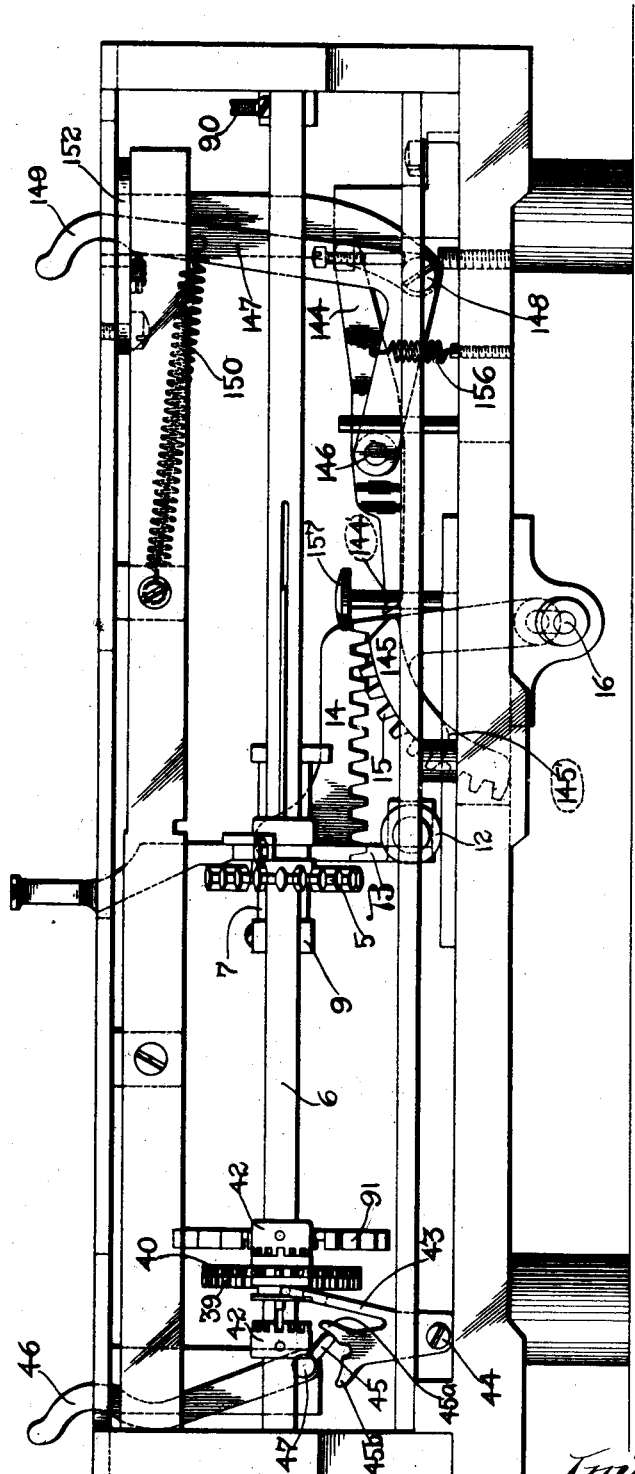

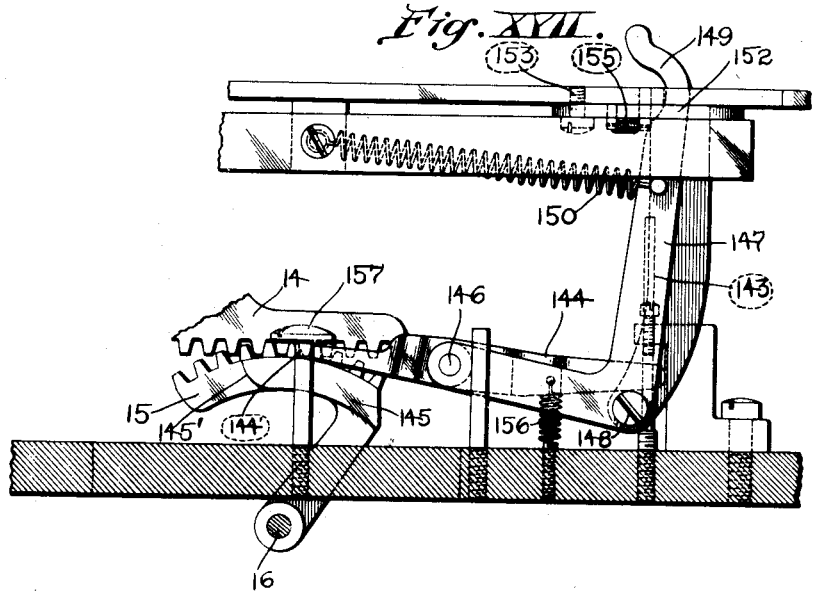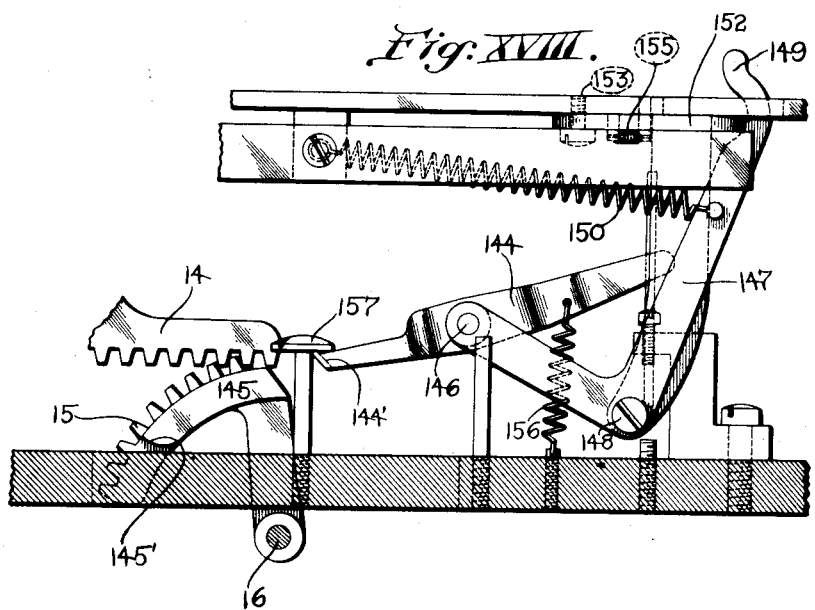

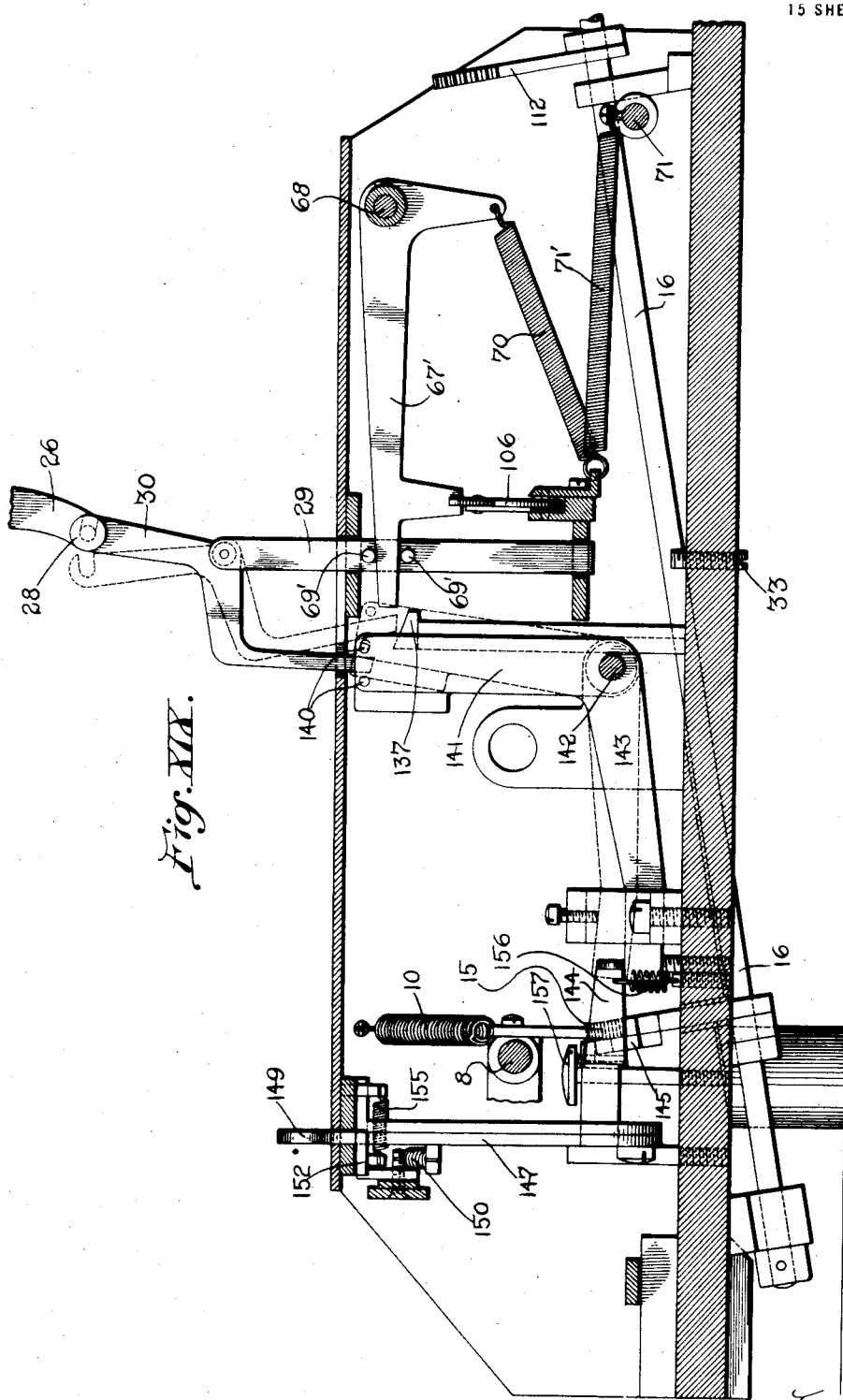

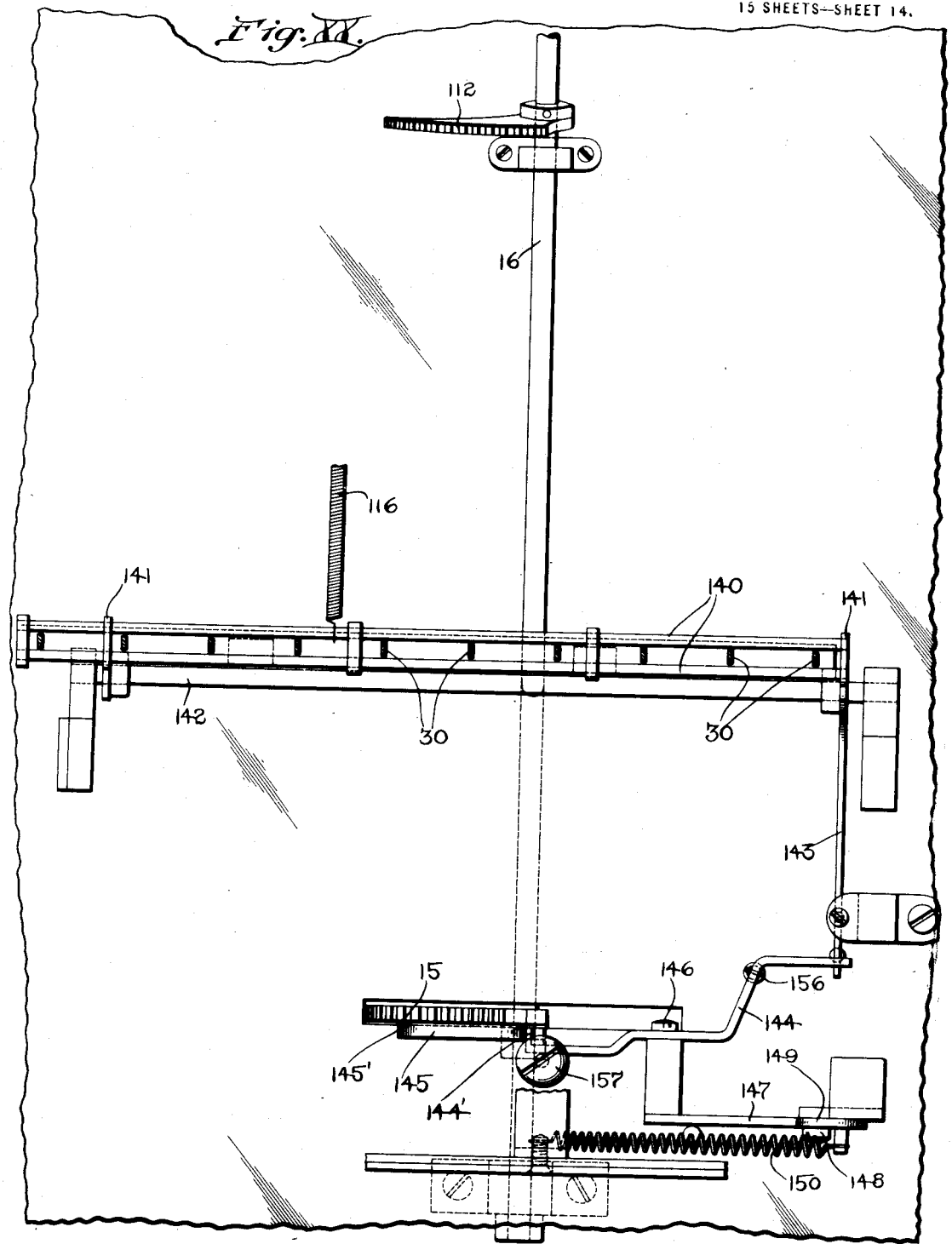

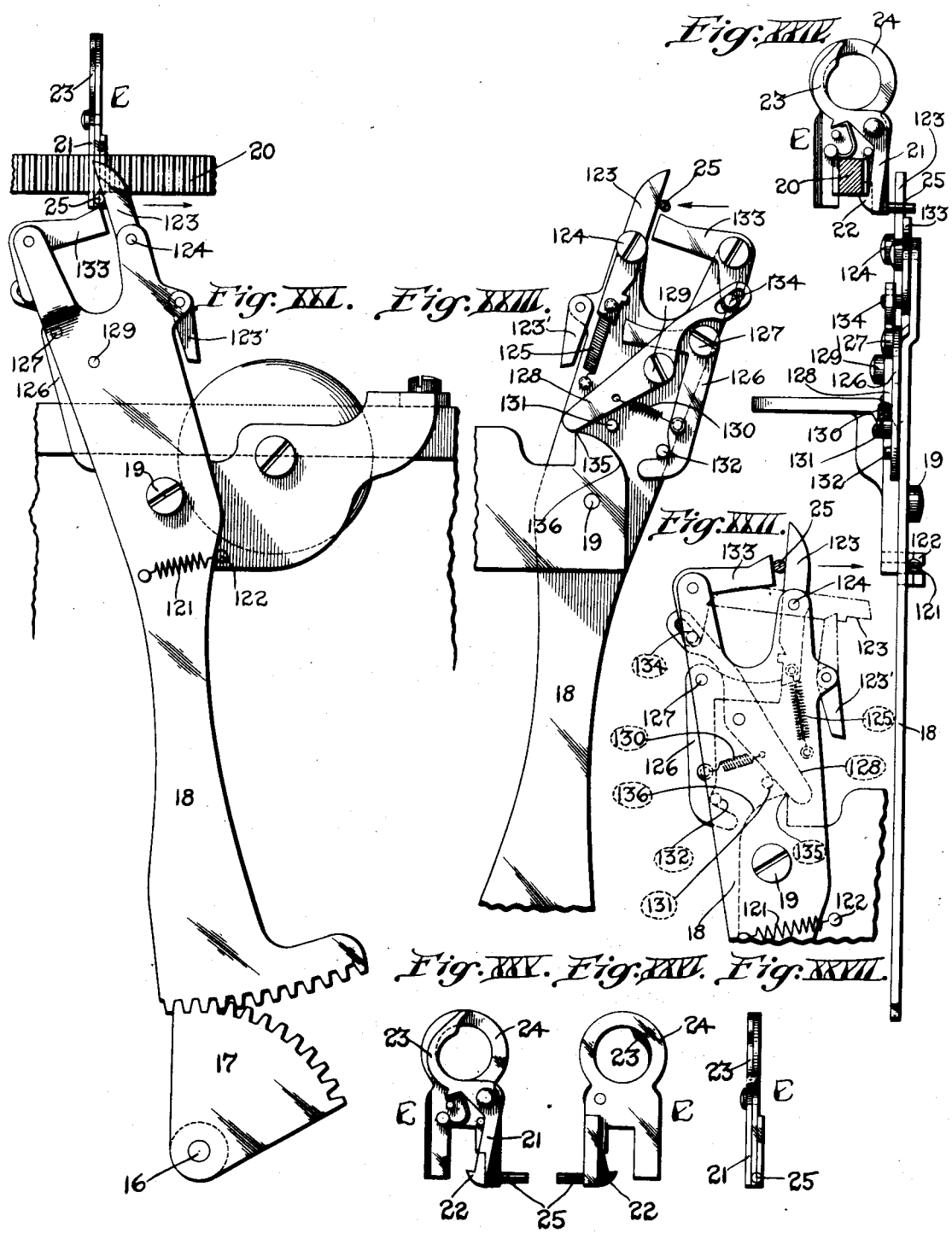

UNITED STATES PATENT OFFICE.

EDWARD C. SCHINKE AND NORMAN A. SUTHERLAND, OF ST. LOUIS, MISSOURI, ASSIGNORS TO TYPEWRITER CALCULATING ATTACHMENT COMPANY, OF ST. LOUIS, MISSOURI, A CORPORATION OF MISSOURI.

CALCULATING-MACHINE.

1,358,114.      Specification of Letters Patent.      Patented Nov. 9, 1920.

Application filed July 29, 1918, Serial No. 247,312. Renewed April 5, 1920. Serial No. 371,479.

*To all whom it may concern:*

Be it known that we, EDWARD C. SCHINKE and NORMAN A. SUTHERLAND, citizens of the United States of America, residents of the city of St. Louis, in the State of Missouri, have invented certain new and useful Improvements in Calculating-Machines, of which the following is a full, clear, and exact description, reference being had to the accompanying drawings, forming a part of this specification.

This invention relates to improvements in calculating machines, and more particularly to calculating mechanism adapted to be actuated by the numeral keys and platen carriage of an ordinary typewriter. The accumulator of the new machine is provided with a traveling element which advances step by step to provide for the transmission of movement to a series of total wheels of different order. This traveling element is preferably, but not essentially, a master wheel which advances one step in response to each operation of the numeral keys, and it is preferably advanced through the medium of the traveling platen carriage on the typewriter.

One of the objects of the invention is to improve the means for transmitting movement from the traveling platen carriage to a master wheel carriage or the like. Another object is to provide a simple and absolutely positive means for holding the traveling master wheel to prevent it from advancing while a key is being actuated to transmit rotary movement to said master wheel.

A further object is to provide a simple and highly efficient means for stopping and locking the mechanism to prevent excessive movement and to prevent accidental displacement of the power transmission wheels.

Another object is to produce a simple shiftable device for controlling the transmission of movement from key actuated digit wheels to the accumulator. This shiftable device preferably includes a toothed member for transmitting movement, and a ratchet for preventing retrograde movement.

A further object is to provide an improved means for connecting and disconnecting the calculating mechanism to and from the numeral keys of the typewriter.

With the foregoing and other objects in view the invention comprises the novel construction, combination and arrangement of parts hereinafter more specifically described and illustrated in the accompanying drawings wherein is shown the preferred embodiment of the invention; however, it is to be understood that the invention comprehends changes, variations and modifications which come within the scope of the claims hereunto appended.

Figure I is a top or plan view of a calculating machine constructed in accordance with our invention, the typewriter being omitted.

Fig. II is a longitudinal section, partly in side elevation, illustrating the calculating machine and a typewriting machine mounted thereon, so as to transmit movement thereto.

Fig. III is an enlarged transverse section taken approximately on the line III—III, Fig. I, showing the numeral keys which do not appear in Fig. I.

Fig. IV is a longitudinal section showing the parts near the left side of the calculating machine.

Fig. V is a detail view illustrating one of the vertically movable key actuated slide bars, or rack bars, the digit wheel actuated thereby, and certain arms and levers also actuated thereby.

Fig. VI is a view similar to Fig. V showing the shiftable toothed wheels for controlling the transmission of movement from the digit wheels to the accumulator.

Fig. VII is an enlarged fragmentary view showing the upper portion of an oscillatory arm and the rear end of a long lever actuated thereby.

Fig. VIII is a fragmentary view showing an adjustable pin through which motion is transmitted from one of the oscillatory devices to another.

Fig. IX is an enlarged top or plan view partly in section showing the elements near the front of the calculating machine.

Fig. X is a transverse section illustrating the means for preventing two keys from being depressed at the same time, also showing the shiftable toothed members on the oscillatory digit wheel shaft.

Fig. XI is a transverse section on line XI—XI, Fig. I.

Fig. XII is a fragmentary plan view showing the means for locking a transmission shaft to prevent the transmission of movement from the platen carriage to the master wheel, also showing the shiftable wheels on the oscillatory digit shaft, and certain devices for shifting said wheels.

Fig. XIII is a detail view of certain devices, including a sector and a pair of locking dogs coöperable therewith to lock the shaft whereby motion is transmitted from the traveling platen carriage to the traveling master wheel. This view shows the parts in the positions they occupy when all of the numeral keys are at rest in their elevated positions.

Fig. XIV is a view similar to Fig. XIII, showing the parts in the positions they occupy at the end of a down-stroke of a key.

Fig. XV is a top or plan view of the parts shown in Fig. XIV.

Fig. XVI is a front elevation, showing the master wheel carriage, a portion of the means for connecting and disconnecting the calculating mechanism, and a shiftable gear wheel through which rotary motion is transmitted to the master wheel shaft.

Fig. XVII is a front elevation of certain parts shown in Fig. XVI, showing said parts in the positions they occupy when the calculating mechanism is connected to the numeral keys of the typewriter.

Fig. XVIII is a view similar to Fig. XVII showing the cam actuated lever in an inoperative position to which it may be shifted for the purpose of preventing the transmission of movement from the numeral keys to the calculating mechanism.

Fig. XIX is a longitudinal section of the vertical slide bar actuated by the "0" key, also showing certain other elements, including the means for connecting the numeral keys to the calculating mechanism.

Fig. XX is a fragmentary plan view illustrating the shiftable means for connecting the calculating mechanism to the numeral keys.

Fig. XXI is a fragmentary rear elevation of certain devices attached to the rear of the typewriter for the purpose of transmitting movement from the traveling platen carriage to the traveling master wheel.

Fig. XXII is a view similar to Fig. XXI showing the traveling pin on the platen carriage arranged between two trippable abutments on the attachment whereby motion is transmitted from the traveling carriage.

Fig. XXIII is a view looking toward the inner face of the long toothed lever shown in Fig. XXI, illustrating the parts in the positions they occupy in Fig. XXI.

Fig. XXIV is a side elevation of parts shown in Figs. XXI and XXIII, the toothed bar on the platen carriage being shown in section.

Fig. XXV to Fig. XXVII are detail views of the adjustable pin holding device, adapted to be secured to the toothed bar on the platen carriage.

Briefly stated, the machine about to be described is a calculating attachment for typewriters, and it is adapted for use with ordinary typewriting machines now on the market. The numbers to be added are written by the typewriter and the total is indicated by an accumulator. The accumulator comprises a series of total wheels of different order, and motion is transmitted from a master wheel to the total wheels. Either the master wheel or the accumulator must travel step by step in response to the key operations. The master wheel is therefore splined to a rotary shaft and mounted on a traveling carriage which moves in unison with the platen carriage of the typewriter. The master wheel is rotated through the medium of the numeral keys of the typewriter.

*The accumulator.*

We do not deem it necessary to show or describe all of the elements of an accumulator, such devices being old and well-known in the art, and no claim is herein made for an accumulator *per se*. The accumulator herein shown (Figs. I and II) comprises a housing A adjustably mounted on long, horizontal bars at the front of the machine. This housing is preferably provided with total indicating wheels 1 which may be viewed through a sight opening 2 in the top of the housing, intermediate wheels 3 meshing with the total wheels, and transmission wheels 4 whereby motion is transmitted from a master wheel 5 to the intermediate wheels 3 and thence to the total wheels 1. In the structure we have shown there are seven total wheels and seven transmission wheels 4, one transmission wheel for each total wheel; however, the accumulator may be provided with any desired number of total wheels. Since the accumulator is not claimed herein, we have not shown the transferring devices, etc., which usually form part of a complete accumulator. The side walls of the stationary accumulator housing A are cut away, as shown in Fig. II, to allow the master wheel 5 to pass to and from the accumulator. The master wheel is splined to a rotary shaft 6, and when the machine is in service this wheel travels step by step, longitudinally of the shaft 6, so as to successively mesh with the transmission wheels 4. The master wheel is rotated through the medium of the numeral keys, as will be hereinafter described.

B designates a master wheel carriage in which the hub of the master wheel is rotatably mounted (Figs. II, IX and XVI), said carriage having a sleeve 7 slidably mounted on a guide-rod 8, and adapted to engage a stop collar 9 adjustably secured to said rod 8. A spring 10 (Fig. IX) connected to the master wheel carriage B tends to retain the sleeve 7 in engagement with the stop collar 9. 12 designates a wheel (Figs. II and XII) rotatably secured to the master wheel carriage B so as to travel along a horizontal track 13. A pointer 12' (Figs. I and IX), carried by the master wheel carriage, serves to indicate the position of the master wheel relative to the accumulator.

*Feeding the master wheel.*

The means for feeding the master wheel along the rotary shaft 6 comprises (Figs. II, IX and XVI) a toothed rack 14 secured to the master wheel carriage B, a toothed sector 15 adapted to mesh with said rack, and a long inclined shaft 16 to which said sector is rigidly secured. To the rear end of the long oscillatory shaft 16 a sector 17 is rigidly secured (Figs. I, II and XXI), and this sector 17 meshes with teeth at the lower edge of a long feeding lever 18, said lever being detachably secured to the typewriter by means of a pivot screw 19. C designates the platen carriage of the typewriter (Fig. II), said carriage being adapted to travel back and forth in a straight horizontal line, and it may be actuated in response to the key operations, as is well understood in the art, the carriage moving one step in response to each key operation. The carriage is shown diagrammatically in Fig. II, and further illustration thereof is deemed unnecessary. The rear portion of the platen carriage C is provided with a long toothed bar 20 (Figs. II, XXI and XXIV), a bar of this kind being present in the carriages of several well-known typewriters now on the market.

E designates a pin-holding clip (Figs. XXI to XXVII) detachably secured to the toothed bar 20 to provide for the transmission of movement from the platen carriage to the long lever 18 at the rear of the machine. This clip is provided with a pair of legs adapted to straddle the toothed bar 20, as shown most clearly in Fig. XXIV, and also provided with a spring actuated detent 21 whereby it is detachably secured to said toothed bar. The detent 21 is provided with a tooth 22 adapted to extend under the bar 20 (Fig. XXIV), and a curved operating finger 23 extends from the upper portion of said detent 21. This curved finger 23 is eccentric to a handle in the form of a finger-receiving ring 24 at the upper portion of the clip. The clip can be readily detached by inserting a finger into the ring 24, pressing the curved member 23 and at the same time pulling the clip upwardly. This will disengage the tooth 22 from the bar 20, so that the clip can be easily lifted from said bar. It will now be understood that the clip E is adjustably mounted on the toothed bar 20, and that it can be easily secured between the teeth of said bar.

25 designates a power transmission pin extending from the clip E (Figs. XXI to XXVII) and adapted to coöperate with certain elements at the upper end of the long lever 18, for the purpose of transmitting movement from the platen carriage to said long lever 18. The abutment fingers at the upper end of the lever 18 coöperate in a peculiar manner with the pin 25, as will be hereinafter described, but it should now be understood that the long lever 18 oscillates in response to movements of the platen carriage, and that motion is thus transmitted from the long lever 18 to the sector 17 at the rear of the machine, and thence through the long inclined shaft 16 (Figs. II and XVI) to the sector 15, which meshes with the rack bar 14 on the master wheel carriage. Motion is thus transmitted from the traveling platen carriage to the traveling master wheel carriage.

*Transmitting movement from key levers to rotary master wheel.*

The ten numeral key levers, representing the characters 0 to 9, inclusive, are shown in Figs. II and III. These key levers form part of the typewriting machine, and they may be considered as the numeral key levers with which typewriting machines are ordinarily equipped, it being unnecessary to change the keyboard of the typewriting machine used with our calculating attachment. 26 designates key lever extensions (Figs. II and III), each of which is secured to one of the numeral key levers 27 and provided with a pin 28 through which motion is transmitted to the calculating machine. Vertically guided slide bars 29, located adjacent to the numeral key levers (Figs. II, III and IX), are connected by means of levers 30 to the key extensions 26, each of said levers 30 being pivoted to the upper end of one of the slide bars 29 and provided with a hook adapted to receive a pin 28 on one of the key extensions 26. These connecting levers 30 are used to transmit power from the numeral key levers to the slide bars 29, and each of said levers 30 can occupy the operative position shown by full lines in Figs. II and XIX, wherein the hook at the upper end of the lever is engaged with a pin 28 on a key extension 26, and said levers 30 may be shifted to the positions shown by dotted lines in Figs. II and XIX so as to allow the numeral keys to be operated without transmitting movement to the calculating mechanism. The means for shifting the levers 30 will be hereinafter described.

There are ten of the vertical slide bars 29, representing the digits "0" to "9," inclusive, and each of these slide bars, excepting the bar associated with the "0" key, is provided with means for transmitting movement to an oscillatory digit wheel shaft 31. The slide bar 29 associated directly with the "1" key will drive the digit wheel shaft 31 a distance corresponding to one step of the calculating operation, the slide bar 29 representing the digit "2" being adapted to drive said shaft 31 a distance of two steps, the slide bar 29 representing "3" being used to drive said shaft three steps, etc.

To accomplish this, each of the slide bars 29 representing the digits "2" to "9," inclusive, may be provided with a predetermined number of rack teeth (Figs. II and V) adapted to mesh with a toothed digit wheel 32 rigidly secured to the digit wheel shaft 31, and the downward movement of each slide bar may be accurately limited by an adjustable stop screw 33 mounted in the base of the calculating machine. Instead of using a single rack tooth on the slide bar 29 associated with the "1" key, we prefer to provide this slide bar with a pin 34 (Figs. IV and IX) adapted to enter a recess in the outer edge of a sector 35 rigidly secured to the shaft 31. A finger 36 (Fig. IV) projecting from the sector 35, forms one of the walls of the pin-receiving recess therein, and said finger 36 lies in the path of the pin 34. When the "1" key is depressed the slide bar 29 associated therewith moves downwardly and its pin 34 (Fig. IV) engages the finger 36 so as to actuate the shaft 31, thereby driving said shaft a distance of one step. The slide bar 29, driven by the "0" key, does not transmit movement to the digit wheel shaft 31, and this particular slide bar may have plain longitudinal edges, as shown in Fig. XIX.

It will now be understood that the numeral keys representing digits "1" to "9," inclusive, are used to actuate slide bars 29 whereby the digit wheel shaft 31 is actuated, and that the degree of movement imparted to the digit wheel shaft depends upon the value of the key from which motion is transmitted.

The means for transmitting movement from the digit wheel shaft comprises a shiftable gear 37 (Figs. III, IV and IX) preferably in the form of a sector splined to the shaft 31 and adapted to mesh with a large gear wheel 38, (Figs. IV and IX), the latter being permanently in mesh with a smaller gear wheel 39 fixed to the shaft or rod 8 near the front of the machine. When the machine is used for addition, the gear wheel 39 meshes directly with a shiftable gear wheel 40, mounted on the rotary master wheel shaft 6. The wheels 39 and 40 are shown in Figs. I, IV, IX and XVI. The train of gearing just described transmits rotary movement from the digit wheel shaft 31 to the master wheel shaft 6, and when the machine is in service the master wheel 5 travels along said shaft 6, advancing step by step from one accumulator wheel 4 to another, so as to successively actuate predetermined total wheels. For example, to introduce the number 296 into the accumulator, the "2" key is depressed while the master wheel registers with an accumulator wheel 4 of the hundreds order. The total wheel of the hundreds order is thus turned two steps, and the master wheel then advances to the tens order. Thereupon the "9" key is depressed, with the result of actuating the total wheel in the tens order, driving it nine steps. The master wheel then moves to the units order, and the "6" key is then depressed to actuate the units wheel.

*Subtraction.*

In subtracting one number from another, the master wheel shaft must be rotated reversely to the direction in which it is driven for addition. A relatively wide or thick reversing pinion 41 (Figs. IV and IX) is therefore permanently in mesh with the gear wheel 39 through which motion is transmitted from the digit wheel shaft to the master wheel shaft, and the gear wheel 40 on the master wheel shaft can mesh directly with said gear wheel 39, as shown in Fig. IX, for the purpose of adding the numbers introduced into the accumulator. Or, the gear wheel 40 can be shifted to the left from the position shown in Fig. IX, so as to pass from the gear wheel 39 to the reversing pinion 41. The gear wheel 40 (Figs. IX and XVI) is splined to the master wheel shaft 6 and provided with clutch teeth adapted to interlock with clutch collars 42 fixed to said shaft 6. The means for shifting the gearwheel 40 (Figs. IX and XVI) comprises a bell crank lever 43 pivotally supported at 44 and provided with an arm which engages a collar on the hub of said wheel 40. The other arm of the bell crank lever 43 is recessed to receive a finger 45 at the lower end of an operating lever 46, the latter being pivoted at 47. By operating the lever 46, motion can be transmitted through the elements just described, for the purpose of shifting the gear wheel 40 on the master wheel shaft, and said wheel 40 is thus shifted by hand so as to be placed in mesh with either the gear wheel 39 for addition or the reversing pinion 41 for subtraction.

To lock or retain the wheel 40 in the position to which it is shifted, the recess in the bell crank lever 43 (Fig. XVI), into which the finger 45 extends, is shaped to form two arcuate faces 45$^a$ and 45$^b$ adapted to engage the end of said finger 45. When the bell crank lever 43 occupies the position shown in Fig. XVI the arcuate face 45ª is concentric with pivot 47, and when said bell crank is shifted to its other position the arcuate face 45ᵇ is concentric with the pivot 47. It may be noted, however, that the arcuate faces are not concentric with each other. By forming the parts in this manner, the finger 45 will coöperate with the arcuate faces 45ª and 45ᵇ to prevent the shiftable gear 40 from being accidentally displaced from the position to which it is shifted.

*The shiftable gear and ratchet on the digit wheel shaft.*

When a numeral key is moving downwardly, it forces one of the vertical slide bars 29 in a corresponding direction, for the purpose of transmitting movement to the accumulator, and at this time the shiftable oscillatory drive gear 37 on the digit wheel shaft 31 must mesh with and drive the large gear wheel 38, as shown in Figs. IV, IX and XII. However, during the return stroke of the numeral key, while it is moving upwardly to its starting position, the digit wheel shaft 31 is rotated reversely and the shiftable gear 37 must then be disengaged from the large gear 38. In other words, the digit wheel shaft 31 oscillates in response to movements of the numeral keys, but the shiftable gear 37 turns the large gear 38 in only one direction. This gear 37 is fixed to a collar 48, said collar being splined to the digit wheel shaft 31 and provided with ratchet teeth 49 which coöperate with a pawl 50 (Figs. III, IV, VI and XII). The ratchet teeth 49 and pawl 50 are shown most clearly in Figs. VI and XII. The pawl 50 is pivoted, at 51, to a stationary part of the machine, and it is provided with an adjustable stop screw 52 adapted to engage an adjustable abutment 53. A spring 54 tends to retain the stop screw 52 in engagement with abutment 53, also tending to retain the pawl 50 in engagement with the ratchet teeth 49 on the shiftable collar 48. The ratchet teeth, of course, move with the shiftable collar, but the pawl 50 does not partake of such movement; it merely oscillates on the axis of its pivot 51.

The adjustable abutment 53 is in the form of an eccentric (Figs. VI and XII) fixed to a screw 53′, the latter being screwed into one of the side walls of the calculating machine and provided with a nut 53ª which may be tightened against said side wall to prevent rotation of the screw and its eccentric. The main function of the eccentric abutment 53 is to limit the strokes of the oscillatory pawl 50.

When a numeral key is moving downwardly, the digit wheel shaft 31 turns in the direction indicated by an arrow in Fig. VI, and the shiftable gear 37 is then positioned as shown in Figs. IX and XII, so as to transmit movement to the accumulator. At this time, the ratchet teeth 49 on the shiftable collar 48 are also positioned as shown in Figs. IX and XII. The pawl 50 cannot engage the ratchet teeth 49 while the gear 37 is in mesh with the large gear 38. Upon the completion of the downward stroke of the key, the gear 37 and ratchet 49 are shifted automatically so as to disengage said gear 37 from the gear 38, at the same time engaging the ratchet teeth 49 with the pawl 50. During the return stroke of the key, the digit wheel shaft 31 turns reversely to the direction indicated by the arrow in Fig. VI, and the gear 37 turns idly for the reason that it is disengaged from the large gear 38. During this portion of the operation, the ratchet teeth 49 engage the pawl 50, but said pawl does not prevent the ratchet teeth from moving oppositely to the direction indicated by the arrow in Fig. VI. By cooperating with the ratchet teeth 49, the pawl 50 prevents the rising numeral key from being prematurely depressed before it reaches the normal or starting position. If an attempt is made to depress the rising numeral key, the ratchet 49 will tend to turn reversely to the direction indicated by the arrow in Fig. VI, and a movement of this kind is prevented by the pawl 50, which then registers with the ratchet teeth.

F designates a shifter in the form of a bell crank lever provided with an upright arm 56 having a forked upper end which extends into an annular groove in the collar 48 for the purpose of shifting said collar and its elements 37 and 49. The shifter F is also provided with an operating arm 57 adapted to be engaged by different devices whereby the shifter is positively actuated. 58 designates a lever pivoted at 59 and forked at one end to receive an end of the operating arm 57. This lever 58 is used to positively move the shifter F in one direction. The shifter is positively moved in the opposite direction by means of a bell crank lever 60 (Figs. III, IV, VI and XII), having an arm 60′ which extends under the operating arm 57. At the beginning of a key operation the lever 58 (Figs. III, VI and XII) is actuated to positively locate the gear 37 in mesh with the large gear 38. At the end of the downward stroke of the key the lever 58 is released, and the bell crank lever 60 is operated for the purpose of disengaging the gear 37 from the large gear 38 and at the same time engaging the ratchet teeth 49 with the pawl 50.

We will now describe the means for actuating the levers 58 and 60. One end of the lever 58 is provided with an adjustable screw 61 (Figs. VI and XII), which engages the top face of a tiltable operating bar 62, the ends of said tiltable bar being provided with the extended pivot pins 63 which are mounted in stationary bearings on the base of the machine. 64 designates a long controlling lever arranged longitudinally of the machine and extending from a point near the tiltable bar 62 to a point near the rear of the calculating machine. The front end of this controlling lever 64 lies under and engages the lower end of a screw 65 adjustably mounted in the tiltable operating bar 62. The long lever 64 is pivotally supported at 66. If the rear end of this long lever is forced downwardly, its front end will move upwardly, engaging the screw 65 in the tilting bar 62, and causing the rear edge of said bar to move upwardly. A movement of this kind will positively locate the shiftable gear 37 in the position shown in Fig. XII. The upwardly moving rear edge of the tiltable bar will engage the screw 61 (Figs. VI and XII) on the lever 58, causing the forked end of said lever to move downwardly so as to actuate the shifter F whereby the gear 37 and ratchet 49 are shifted on the shaft 31.

The means for transmitting movement to the long operating lever 64 (Figs. I, II, V and IX, especially Fig. V) comprises a series of bell crank levers 67 loosely mounted on a stationary rod 68, each of said levers having an approximately horizontal arm which extends between two pins 69 projecting from one of the slide bars 29. There are nine of the bell crank levers 67, one for each of the numeral keys "1" to "9." The slide bar 29 associated with the "0" key (Fig. XIX) is provided with pins 69' engaging a bell crank lever 67', which is also loosely supported on the stationary rod 68. The lever 67' does not actuate the calculating mechanism. 70 designates restoring springs connected to the bell crank levers 67 and 67' so as to yieldingly hold said levers in the positions shown in the drawings. A rock shaft 71 is located near and arranged parallel with the stationary rod 68 for the purpose of transmitting movement from the individual key actuated bell cranks 67 to various other elements of the machine. Arms 72 are rigidly secured to the rock shaft 71. There are nine arms 72, one for each bell crank 67, and the upper end of each arm 72 is recessed and provided with a projecting finger 73, arranged in the path of a pin 74 extending from the lower end of a bell crank lever 67. Each pin 74 is eccentrically mounted on a disk 75 (Fig. VIII) having a central pin 76 which passes through the bell crank 67. Each central pin 76 (Figs. VIII and XI) is threaded to receive a nut 77 whereby the disk 75 is adjustably secured to the bell crank 67. Movement must be very accurately transmitted from the bell cranks 67, and the necessary high degree of accuracy can be easily obtained by adjusting the disks 75 so as to properly locate the eccentrically mounted pins in their proper positions.

When one of the bell crank levers 67 is actuated by a numeral key, its pin 74 engages a projecting finger 73 on one of the arms 72, so as to transmit movement through said arm 72 to the rock shaft 71. All of the arms 72 are rigidly secured to the rock shaft, and when one of said arms is driven by means of a bell crank 67 the other arms 72 move idly with the rock shaft, the fingers 73 on the idly moving arms being free to pass away from the pins 74 with which they are directly associated. 71' designates a restoring spring (Figs. I and XIX) connected to the shaft 71 so as to yieldingly hold the arms 72 in the position shown by Fig. V.

The means for transmitting movement from the rock shaft 71 to the long controlling lever 64 comprises an approximately vertical operating arm 78 rigidly secured to the rock shaft 71, and having at its upper end a cam finger 79 which coöperates with a cam finger 80 at the rear end of lever 64. These cam fingers 79 and 80 are shown clearly in Fig. V, VII and XII. When the upper end of the operating arm 78 moves rearwardly from the starting position shown in Fig. V its cam finger 79 engages the cam finger 80, passing over said finger 80 and thereby forcing the latter downwardly. This forces the rear end of the long lever 64 in a downward direction, thereby moving the front end of said lever upwardly to actuate the tilting bar 62. A movement of this kind occurs at the beginning of each operation of a numeral key (excepting the "0" key), the operating lever 78 being driven by the rock shaft 71 which begins its movement at the beginning of the key operation. Therefore, at the beginning of the key operation, the tilting bar 62 is operated for the purpose of acting upon the lever 58 and shifter F (Figs. VI and XII) so as to positively locate shiftable gear 37 in a position where it will mesh with the large gear 38. During the downward stroke of the key the finger 79 (Figs. V and VII) overlies the cam finger 80 so as to positively hold the rear end of the long controlling lever 64 in a depressed position, thereby positively retaining the gear 37 in mesh with gear 38. At the end of the downward stroke of the key the cam finger 79 passes from the cam finger 80, thereby releasing the long lever 64 and permitting the gear 37 to be shifted to an inoperative position, as will be presently described. It may be remembered that the gear 37 oscillates in response to movements of the key levers, and that it must not mesh with the gear 38 during the upward stroke of the key.

The means for shifting the gear 37 to its inoperative position comprises a bell crank lever 60 (Figs. III, IV, VI and XII), having an approximately horizontal arm which extends under the shifter F. 81 designates a shifter controlling arm (Figs. IV, VI and XII) rigidly secured to the rock shaft 71 so as to oscillate in response to movements of the numeral keys. A spring 82 yieldingly connects the arm 81 to the bell crank lever 60. During the downward stroke of a key the arm 81 moves rearwardly, from the position shown by full lines in Fig. VI to the position shown by dotted lines, thereby tensioning the spring 82 and tending to actuate the bell crank lever 60. At the end of the downward stroke of the key, the shifter F is released, as previously pointed out, and the spring 82 is then permitted to actuate the bell crank lever 60 for the purpose of shifting the gear 37 to its inoperative position. At this time the arm 81 occupies the position shown by dotted lines in Fig. VI, so the spring 82 is under a high degree of tension and it will quickly actuate the shifter F by moving the bell crank lever 60 to the position shown by dotted lines in Fig. VI. To positively retain the gear 37 in an inoperative position during the upward stroke of the key, the bell crank lever 60 is locked in the position shown by dotted lines in Fig. VI.

83 designates a locking dog (Figs. IV, VI and XII) pivotally mounted at 84 and adapted to coöperate with a shoulder 85 on the upper end of the bell crank lever 60. A tripping pin 86, carried by the arm 81, is adapted to engage the rear end portion of the locking dog 83, so as to move said dog from the position shown by dotted lines in Fig. VI to the inoperative position shown by full lines. At the end of the downward stroke of a key, when the arm 81 and bell crank 60 occupy the positions shown by dotted lines in Fig. VI, the locking dog 83 is permitted to drop by gravity to the position shown by dotted lines, wherein it will coöperate with the shoulder 85 on the bell crank lever 60. The bell crank is thus locked in the position shown by dotted lines (Fig. VI) at the end of the downward stroke of the key. During the upward stroke of the key, the arm 81 moving with the rock shaft 71 gradually moves from the position shown by dotted lines (Fig. VI) to the position shown by full lines. At the end of the upward stroke of the key, the pin 86 strikes the rear end of the locking dog 83, so as to release said dog from the bell crank 60, thereby permitting the bell crank to move to the position shown by full lines in Fig. VI. At this time the spring 82 (Fig. VI) is free of tension, arm 81 being in the position shown by full lines, and the bell crank 60 is, therefore, free to move to its inoperative position, shown by full lines. This releases the shifter F and permits it to be actuated by the forked lever 58, the latter being free to turn on its pivot 59, and it is heavy enough to (not positively) actuate the shifter F so as to restore the gear 37 to its operative position. The gear 37 may be thus restored at the end of the upward stroke of the key, but it is not absolutely necessary to restore the gear at this time. As a key begins its downward stroke, the gear 37 is positively located in its operative position through the medium of the cam fingers 79 and 80 at the rear end of the long controlling lever 64, whereby the tilting bar 62 is actuated to transmit movement to the forked lever 58, or to positively hold said forked lever in the position shown by Figs. VI and XI, wherein it positively retains the gear 37 in mesh with the gear 38.

From the foregoing it will be understood that the gear 37 is positively located in its operative position at the beginning of a key operation, and that it is positively held in said position during the downward stroke of the key. At the end of the downward stroke, the gear 37 is shifted to its inoperative position by means of spring 82 (Fig. VI) and it is positively held there by the locking dog 83 coöperating with the bell crank 60. At the end of the upward stroke of the key, the locking dog 83 is released, permitting the gear 37 to be shifted at once, if the weight of the forked lever 58 is sufficient to actuate the shifter F. If the gear 37 is shifted immediately, it will occupy the position shown in Fig. IX wherein it meshes with the gear 38, but if it is not shifted it will occupy an inoperative position, and the ratchet teeth 49 on the collar 48 will register with the pawl 50. The more or less uncertain conditions to which we are now referring exist only when all of the keys are elevated, and at this time the machine is idle so the exact positions of the shiftable gear and ratchet are immaterial. However, all of the rotating wheels should be locked when the machine is not in use.

*Means for locking the mechanism.*

When all of the numeral keys are elevated, or in their normal positions, the ratchet teeth 49 may register with the pawl 50, and in this event the elements 49 and 50 will prevent the digit wheel shaft 31 from turning in one direction, and if the ratchet teeth do not register with the pawl 50 the gear 37 will mesh with gear 38, and movement in the direction just referred to will be prevented by means of another locking device to be hereinafter described. A stop pin 87 (Fig. III) coöperates with a finger 88 extending from a collar 89 on one end of the digit wheel shaft 31 to stop said shaft in its normal or starting position. A restoring spring 90 (Figs. III and IX) connected to the collar 89 tends to retain the stop finger 88 in engagement with the stop pin 87. When the keys are all elevated, the elements 87 and 88 coöperate with each other to prevent movement in one direction, and movement in the opposite direction is prevented by the ratchet and pawl 49 and 50, or by another locking device which will now be described.

The train of gearing leading from the shiftable gear 37 to the master wheel shaft includes a gear wheel 39 (Figs. I, IV and IX) rigidly secured to a shaft 8. 91 designates a stop wheel, or locking wheel, fixed to the shaft 8 and provided with teeth which extend laterally from the wheel, as shown in Fig. IX. When the machine is idle, a horizontal locking dog 92 (Figs. I, IV and IX) coöperates with a tooth of the locking wheel 91 to prevent rotation in one direction, rotation in the opposite direction being prevented by means of a pair of spring actuated pawls 93 coöperating with teeth of the large gear wheel 38. The locking pawls 93 may be connected together by means of a spring 94, as shown in Fig. IV. These pawls 93 are always positioned to prevent retrograde movement of the train of gearing including the gear 38, and when this train of gearing is to be actuated the horizontal locking dog 92 must be disengaged from the locking wheel 91. At the beginning of the downward stroke of a key the locking dog 92 is released from the locking wheel 91 and it remains in an ineffective position until the down stroke of the key is completed, whereupon said locking dog is quickly thrown to its operative position, so as to prevent excessive movement of the gear, and it remains in the last mentioned position until one of the numeral keys is depressed.

95 designates a spring (Fig. IX) connected to the locking dog 92 and tending to retain the latter in its operative position, wherein it coöperates with the locking wheel 91. One end of the locking dog 92 lies in the path of a pin 96 secured to and extending upwardly from the tilting bar 62, as shown in Figs. VI and IX. At the beginning of the downward stroke of a key, the tilting bar 62 is actuated through the medium of the long controlling lever 64, as previously pointed out, and by this operation the vertical pin 96 on the tilting bar is actuated to disengage the horizontal locking dog 92 from the wheel 91, permitting the train of gearing to be actuated while the key is moving downwardly. During the downward stroke of the key, the vertical pin 96 remains in engagement with the locking dog 92, so as to positively retain the latter in its ineffective position, and at the end of the downward stroke, when the long controlling lever 64 is released, as previously pointed out, the tilting bar 62 is permitted to turn on its pivot 63, and the spring 95 then restores the locking dog 92 to the operative position shown in Figs. IV and IX. The spring 95 also serves as a means for restoring the tilting bar 62 to the position shown by Figs. VI and IX.

The calculating mechanism is driven very rapidly in response to the rapid key operations, and this mechanism should be positively stopped to prevent excessive movement. It may appear that the fast moving locking dog 92 would positively stop the mechanism, but this dog is spring actuated and may not accomplish the desired result under all conditions, its main function being to lock the train of gearing. To positively stop the train of gearing we preferably utilize an approximately vertical stop dog 98 shown in Figs. I, IV and IX. The upper end of this stop dog 98 is provided with a long, narrow tooth adapted to pass between the laterally extending portions of the teeth on the locking wheel 91. Fig. IX shows that the teeth of wheel 91 extend laterally to receive the dog 98. When a numeral key has almost completed its downward stroke, the long tooth of the stop dog 98 enters between two of the teeth on the locking wheel 91, and as the key continues to move downwardly the dog 98 continues to move toward the locking wheel 91. By positively actuating the stop dog 98 before the key reaches the end of its downward stroke, we positively stop the locking wheel 91 to prevent excessive movement. It is to be understood that the locking wheel 91 continues in motion after the locking dog enters between two of its teeth, but the continued motion is less than $\frac{1}{20}$ of a revolution.

By referring to Fig. IV it will be noted that the stop dog 97 is in the form of a bell crank lever, pivotally supported at 99 and connected by means of a link 100 to an arm 101, said arm being fixed to a rock shaft 102. The stop dog 97 must be operable by all of the numeral keys, excepting the "0" key, and the rock shaft 102 is therefore provided with a series of arms 103 (Figs. I, II and IV), each of said arms 103 extending into the path of a pin 69 on one of the vertically movable slide bars 29. There are nine of the arms 103, one for each of the nine numeral keys. It will be remembered that the slide bars 29 move downwardly with the numeral keys. When a numeral key has almost completed its downward stroke, a pin 69 (Figs. II and IV) strikes one of the arms 103, and as the key continues to move downwardly motion is transmitted from the pin 69 to the arm 103, and thereby to the rock shaft 102 to which the arm 101 (Fig. IV) is secured. Motion is also transmitted from the arm 101 (Fig. IV) to the link 100, so as to actuate the stop dog 98, causing said dog to coöperate with a tooth on the locking wheel 91. At the end of the downward stroke of the key the locking wheel 91 is positively stopped by the dog 98, and the spring actuated locking dog 92 is thrown to its operative position, in a manner previously described. At the beginning of the upward stroke of the key, the stop dog 98 is acted upon by a restoring spring 104 (Figs. IV and IX), whereby said dog is withdrawn from the wheel 91.

The spring actuated locking dog 92 moves very quickly to its operative position and the stop dog 98 is driven by the keys at a relatively slow speed. However, the stop dog is positively driven to its operative position and it will positively stop the train of gearing.

*Means for preventing two keys from being depressed at the same time.*

The bell crank levers 67 are provided with depending legs 105, which lie above a horizontal row of pivotally mounted fingers 106 (Figs. IV and IX). The fingers 106 at the opposite ends of the row are connected together by means of a long bar 107, one end of the long bar being connected by means of a pivot pin 108 (Fig. X) and the opposite end of the bar being provided with a slot 109 for the reception of a pin 110 secured to the adjacent finger 106. The fingers 106 lie very close to each other, but the slot and pin connection 109—110 allows any two adjacent fingers to be separated a distance approximately equal to the thickness of one of the depending legs 105. When a key is depressed, one of the bell crank levers 67 (Figs. IV and X) is actuated as previously pointed out, and its depending leg 105 moves downwardly between two of the fingers 106. This forces the last mentioned fingers away from each other and locates the pin 110 in the left hand end of the slot 109 shown in Fig. X. Therefore, no other key can be depressed while the leg 105 lies between two of the fingers 106. When the effective key has almost completed its upward stroke, the depending leg 105 passes from the fingers 106 and any other key can then be selected and depressed, with the result of forcing another leg 105 between two of the loosely mounted fingers 106.

*Locking the master wheel carriage.*

An ordinary typewriting machine is provided with a key actuated escapement device for controlling the step by step movement of the platen carriage, the latter moving one step during each key operation. However, the ordinary escapement devices are so constructed that the carriage is permitted to move, or jump, a slight distance during a downward stroke of the key, the step being completed by a continued movement of the carriage which usually takes place while the key is moving upwardly. The calculating machine herein shown is intended to be used with an ordinary typewriter, and the master wheel 5 is rotated by the downward movements of the numeral keys. During this rotary movement the master wheel meshes with one of the wheels of the accumulator and it must not be permitted to travel along the shaft 6 to which it is splined. Movement is transmitted from the traveling platen carriage of an ordinary typewriting machine to the traveling master wheel 5 for the purpose of advancing the master wheel along the shaft 6, and the platen carriage, as well as the master wheel carriage, is preferably locked to prevent the master wheel from traveling during the downward stroke of the numeral key, while rotary movement is being transmitted to the master wheel. The locking means also prevents the operator from shifting the platen carriage, in either direction whenever a key is depressed and locked before making a complete downward stroke.

This locking means comprises a toothed sector 112, arranged below the middle portion of the typewriting machine and fixed to the long inclined shaft 16, through which movement is transmitted from the platen carriage to the master wheel carriage. This locking means is shown most clearly in Figs. II, V, XI and XII to XV, inclusive. Locking dogs 113 and 114, pivotally mounted at 115, are provided with oppositely disposed teeth which coöperate with the teeth of sector 112. When the machine is idle these locking dogs are disengaged from the sector 112, as shown in Figs. XII and XIII. A spring 116, connected to a pin 117 on the dog 113, tends to move said dog into locking engagement with the sector 112. The locking dog 114 is slotted to receive the upper end of an arm 118 extending from one of the arms 72 on the rock shaft 71, which oscillates in response to the strokes of the numeral keys. During the downward stroke of the numeral key the arm 118 moves toward the rear of the machine, and during the upward stroke it is restored to the position shown in Figs. V and XII. The locking dog 113 is provided with an extended abutment finger 119 adapted to engage an abutment finger 120 carried by the long controlling lever 64 (Figs. XII and XIII).

When the machine is idle the spring 116 (Figs. XII and XIII), acting upon the locking dog 113, retains its abutment finger 119 in engagement with the abutment finger 120, and the arm 118 retains the locking dog 114 in the position shown by Figs. XII and XIII. At the beginning of the downward stroke of a numeral key, the rock shaft 71 is actuated, as previously pointed out, so as to depress the rear end of the long controlling lever 64, movement being transmitted from an arm 78 on said rock shaft to a cam finger 80 on the rear end of the long lever 64. This downward movement of the lever 64 quickly releases its abutment finger 120 (Figs. XII and XIII) from the abutment finger 119 on the locking dog 113, thus permitting spring 116 to quickly throw said locking dog into engagement with the toothed sector 112. The sector is thus locked at the beginning of the key operation so as to prevent the master wheel from traveling during the downward stroke of the key.

As the key continues to move downwardly the arm 118, moving with the rock shaft 71, gradually forces the locking dog 114 toward the sector 112. Near the end of the downward stroke of the key the dog 114 enters between two teeth on sector 112, at the same time engaging the pin 117 on the locking dog 113, so as to push the latter away from the sector. The locking dogs then occupy the positions shown in Figs. XIV and XV. At the end of the downward stroke of the key the long controlling lever 64 is released from the cam finger 79, as previously described, and the rear end of said long lever rises to the position shown in Fig. XIV, thereby locating the abutment finger 120 in a position directly in front of abutment finger 119 on the dog 113. At the beginning of the upward stroke of the key the arm 118, moving with the rock shaft 71, withdraws the dog 114 from the sector 112; and the dog 113, which is then acted upon by spring 116 (Fig. XV), tends to follow the dog 114. However, the locking dog is soon stopped in an inoperative position when its abutment finger 119 strikes abutment finger 120 on the long lever 64. The withdrawal of the dog 114, by means of the arm 118, releases the sector 112 at the beginning of the upward stroke of the key, and the platen carriage is then free to advance one complete step for the purpose of advancing the master wheel during the return stroke of the key, when the oscillatory digit wheel shaft 31 is moving idly to its starting position.

During the downward stroke of a key, rotary motion is transmitted to the accumulator and this motion continues until the key has completed its downward stroke. However, the locking dog 113 must pass from the sector 112 before the completion of the downward stroke and it is therefore an important advantage to lock the sector by the dog 114 at the end of the downward stroke, while the dog 113 occupies an inoperative position.

*Connecting the platen carriage to the master wheel feeder.*

When the platen of the typewriter carriage reaches a predetermined position, it begins to transmit movement to the means for feeding the master wheel 5 along the shaft 6, and after the master wheel passes from the accumulator the feeding means is disengaged from the platen carriage, permitting the latter to continue in motion without advancing the master wheel. We have already described the means for transmitting movement from the traveling platen carriage to the traveling master wheel, and attention is now directed to the means whereby the platen carriage is connected to and disconnected from the long feeding lever 18 attached to the rear of the typewriting machine. This feeding lever (Figs. II and XXI to XXIV, inclusive) is in the form of a sector meshing with the sector 17 at the rear end of the long inclined shaft 16 through which movement is transmitted to the master wheel carriage at the front of the machine. The power transmission pin 25, adjustably secured to the rear portion of the platen carriage, forms part of the means for connecting said carriage to the feeding lever 18. 121 designates a restoring spring connecting the lever 18 to a stop pin 122 and tending to retain said lever in engagement with the stop pin, as shown in Fig. XXI. An elongated trippable abutment finger 123 is pivoted at 124 to the long lever 18, and this finger 123 extends into the path of the traveling pin 25, so as to transmit movement from said pin to the lever 18. A spring 125, connected to the lower end of the finger 123, tends to retain said finger in the position shown by Figs. XXI and XXIII. 126 designates a lever for stopping and tripping the finger 123, said lever 126 being a bell crank pivoted at 127 and having one of its ends normally arranged in the path of the lower end of finger 123. A lever 128 is pivoted at 129 to the lever 18 and connected to the lever 126 by means of a spring 130. This spring tends to retain the last mentioned levers in engagement with stop pins 131 and 132, respectively, as shown in Fig. XXII. 133 designates an angular retaining finger, or bell crank, movable into the path of the traveling pin 25 so as to coöperate with the finger 123 in connecting the platen carriage to the long feeder lever 18. A pin 134, projecting from the depending arm of lever 133, lies in a slot at the upper end of the inclined lever 128.

When the machine is not in service the parts just described occupy positions shown in Figs. XXI and XXIII, the trippable abutment finger 123 being in the path of the traveling pin 25, and the upper end of the retaining lever 133 being below said path. When the traveling pin 25 strikes the finger 123, it first of all turns said finger a slight distance on the pivot 124, causing the lower end of the finger to engage the adjacent end of the trip lever 126. As the carriage continues in motion movement will be transmitted through the finger 123 to the long lever 18, so as to turn the latter on its pivot 19, thereby driving the master wheel carriage with the platen carriage. At the beginning of this movement the lower end of the inclined lever 128 (Figs. XXII and XXIII) passes from a cam shoulder 135 on a stationary part of the machine, thus permitting the spring 130 to force the inclined lever 128 into engagement with the stop pin 131, as shown in Fig. XXII. This movement of the inclined lever 128 results in the transmission of movement from the upper end of said lever to the pin 134 on the angular retaining finger 133, causing the free end of said finger to rise into the path of the traveling pin 25. The traveling pin is thus confined in a restricted space between the fingers 123 and 133. Movement can then be transmitted in either direction from the pin 25 to the large feeding lever 18, and under these conditions the latter can not be accidentally thrown, or otherwise moved, independently of traveling pin 25.

It is also important to observe that the traveling pin 25 can be moved vertically along the finger 123 without disconnecting the platen carriage from the large feeding lever 18. The advantage of this particular feature lies in the fact that it enables the attachment to be used on a typewriting machine wherein the platen carriage is shifted vertically for the purpose of writing upper case letters, punctuation marks, etc. It is sometimes necessary or desirable to shift the platen carriage vertically while it is connected to the means for feeding the master wheel, and this can be done without materially disarranging the connecting devices herein shown.

When the traveling master wheel passes from the accumulator, the elongated abutment finger 123 is tripped to permit the spring 121 to restore the large feeding lever 18. Immediately before this tripping operation the lower end of the trip lever 126 (Figs. XXII and XXIII) strikes a stationary abutment 136, and as the large lever 18 continues in motion the trip lever 126 turns on its pivot 127, thereby releasing the elongated abutment finger 123 and permitting the spring 121 to quickly restore the large lever 18.

After the traveling pin 25 is disengaged from the trippable finger 123 the platen carriage can continue in motion for ordinary typewriting, and when the carriage is eventually restored the traveling pin 25 will pass idly over the trippable finger 123, merely turning the latter on its pivot 124 without actuating the large feeder lever 18.

To disconnect the master wheel feeder from the platen carriage, thereby permitting said carriage to travel back and forth without feeding the master wheel, the trippable abutment finger 123 may be held in the position shown by dotted lines in Fig. XXII, wherein it lies entirely below the path of the traveling pin 25. The means for holding the finger 123 in this position comprises a latch finger 123' pivoted to the large lever 18 and adapted to occupy the position shown by dotted lines in Fig. XXII, wherein its upper end lies in a notch in the finger 123. When the calculating attachment is to be used with the typewriter, the latch finger 123' occupies the position shown by full lines in Fig. XXII and does not in any way interfere with the movements of the abutment finger 123.

*Connecting the numeral key levers to the calculating mechanism.*

We have previously referred to the angular levers 30 whereby movement is transmitted from the numeral key extensions 26 to the slide bars 29. These levers 30 can occupy the positions shown by full lines in Figs. II and XIX, wherein the hooks at the upper ends of the levers are engaged with pins 28 on the key extensions 26, so as to transmit power to the slide bars 29. The angular connecting levers 30 can also occupy the positions shown by dotted lines in Figs. II and XIX, and when so positioned their lower ends will lie directly above and adjacent to a long stop bar 137. The numeral keys can then be actuated without driving the connecting levers 30, and the stop bar 137 prevents the latter from being accidentally actuated.

The lower ends of the angular connecting levers 30 lie between a pair of rods 140 carried by a pair of rockable arms 141 fixed to a rock shaft 142 (Figs. II, IX, XIX and XXII), said rock shaft being provided with an operating arm 143 which may be actuated for the purpose of moving the connecting levers 30 so as to connect and disconnect the calculating mechanism. The means for actuating the arm 143 comprises a lever 144, one end of which normally rests upon the arm 143, and a cam 145 adjacent to the opposite end of said lever. The lever 144 is pivoted at 146 and the cam 145, which coöperates with said lever, is carried by the sector 15 whereby the master wheel carriage is driven.

When the master wheel approaches the accumulator, an inclined end of the cam 145 (Fig. XVI) engages one end of the lever 144, moving said end upwardly and moving the opposite end of the lever downwardly, so as to actuate the arm 143, thereby moving the rock shaft 142 and its upwardly extending arms 141 so as to locate the connecting levers 30 in the position shown by full lines in Fig. XIX. A movement of this kind is yieldingly resisted by the tension spring 116

(Figs. I and II), which is connected to one of the small rods 140 adjacent to the lower ends of the levers 30. The spring 116 normally retains the connecting levers 30 in their inoperative positions wherein they are disconnected from the key extensions, and immediately before the master wheel reaches the first accumulator wheel the cam 145 becomes effective so as to automatically connect the levers 30 to the key extensions. As the master wheel continues to travel along the accumulator, an arcuate face at the top of cam 145 (Fig. XVII) moves under and engages the lever 144 so as to positively retain the angular connecting levers 30 in their operative positions. When the master wheel passes from the accumulator the arcuate face of cam 145 passes from the cam actuated lever 144, permitting the long spring 116 (Figs. I and II) to restore the angular connecting levers 30 to their inoperative positions. In restoring the connecting levers the spring 116 moves the operating arm 143 (Figs. I, XIX and XX) in an upward direction, thereby lifting one end of the cam actuated lever 144 and causing the opposite end to move downwardly, the last mentioned end being located at the cam 145 and being provided with a lateral extension 144', which coöperates with the cam. Therefore, when the cam 145 passes from the lateral extension 144', said extension will lie opposite to a curved face 145' at one end of the cam, and when the sector 15 is restored with the master wheel carriage, the curved face 145' will engage the lever extension 144', thereby idly moving the lever 144 without transmitting movement from said lever, and when the sector 15 reaches its starting position the cam 145 and lever 144 will occupy the relative positions shown in Fig. XVI. In actuating the lever 144 to connect the calculating mechanism to the typewriter, the top face of cam 145 engages the lever extension 144', and during the return stroke of the cam its bottom face engages said extension 144', the end face 145', of the cam being used to shift the lever extension 144' to the bottom face of the cam.

To render the calculating machine inoperative, in other words, to prevent the cam 145 from automatically connecting the calculating mechanism to the typewriter, we provide means for lifting the entire lever 144 so that its lateral extension 144' will lie entirely beyond the path of the cam 145, and this lifting operation is accomplished without transmitting movement from said lever 144 to the adjacent operating arm 143. The pivot 146 of the lever 144 is attached to a shifter 147 in the form of a bell crank lever pivoted at 148 and provided with an operating handle 149, which may be moved by the operator of the machine. A spring 150 tends to retain the shifter lever 147 in the position shown by Figs. I and XVI, wherein its operating handle engages an end wall of a slot 151 in a stationary part of the machine. When the shifter 147 is moved to the position shown in Fig. XVIII, it is locked by means of a detent 152 pivoted at 153 and provided with a tooth 154 (Fig. IX), which lies in the path of the upper portion of the shifter 147. A spring 155 (Figs. IX and XIX) yieldingly holds the detent 152 in engagement with the shifter 147. It will now be understood that when the shifter 147 is moved to the position shown by Fig. XVIII, it is yieldingly held there by the detent 152.

The detent 152 also serves as a stop for the operating handle 149. If the operator desires to disconnect the calculating mechanism for a brief interval of time, for example, during one key operation, the operating handle can be held against the detent tooth 154, without using the detent as a latch for the handle.

In moving from the position shown by Fig. XVII to the position shown in Fig. XVIII, the shifter 147 moves the pivot pin 146 upwardly, thereby elevating the cam actuated lever 144, locating its lateral extension 144' in a plane beyond the path of the cam 145. When the lever 144 occupies the last mentioned position (Fig. XVIII) a spring 156 is placed under tension, and this spring retains the lever extension 144' in engagement with a stationary abutment 157, thereby preventing the cam actuated lever from accidentally moving into the path of the cam.

To indicate the positions of the connecting levers 30 relative to the key extensions 26, an indicator arm 30' is located near the front of the machine where it can be seen by the operator, (see Figs. I and II). This indicator arm is pivoted at 30ª, and it is connected by means of a wire link 140' to one of the rods 140 near the lower ends of connecting levers 30. The indicator arm 30' therefore moves with the connecting levers 30, and it serves as a convenient means for determining whether said arms are positioned to transmit movement to the calculating mechanism.

We claim:

1. The combination with a typewriting machine having digit keys and a platen carriage, of calculating mechanism comprising an accumulator provided with total wheels and a traveling carriage movable step by step to provide for the transmission of movement to the different total wheels, accumulator operating means including devices whereby motion is transmitted from said digit keys to impart rotary motion to the total wheels, and feeding devices whereby motion is transmitted from said platen carriage to said traveling carriage so as to advance the latter step by step, said feeding devices comprising a traveling power transmission member carried by said platen carriage, a driven member through which motion is transmitted to said traveling carriage, said driven member having a pair of oppositely disposed abutments between which said traveling power transmission member is confined so as to transmit movement in opposite directions to said member and a tripping device whereby one of said abutments is tripped to release said driven member from said traveling power transmission member.

2. The combination with a typewriting machine having digit keys and a platen carriage, of calculating mechanism comprising an accumulator provided with total wheels and a traveling carriage movable step by step to provide for the transmission of movement to the different total wheels, accumulator operating means including devices whereby motion is transmitted from said digit keys to impart rotary motion to the total wheels, and feeding devices whereby motion is transmitted from said platen carriage to said traveling carriage so as to advance the latter step by step, said feeding devices comprising a traveling power transmission member carried by said platen carriage, a driven member through which movement is transmitted to said traveling carriage, a trippable abutment extending from said driven member and located in the path of said traveling power transmission member to provide for the transmission of movement to the driven member, and a tripping device whereby said abutment is tripped to release the driven member from said traveling power transmision member.

3. The combination with a typewriting machine having digit keys and a platen carriage, of calculating mechanism comprising an accumulator provided with total wheels and a traveling carriage movable step by step to provide for the transmission of movement to the different total wheels, accumulator operating means including devices whereby motion is transmitted from said digit keys to impart rotary motion to the total wheels, and feeding devices whereby motion is transmitted from said platen carriage to said traveling carriage so as to advance the latter step by step, said feeding devices comprising a traveling power transmission member carried by said platen carriage, a driven member through which movement is transmitted to said traveling carriage, a trippable abutment pivoted to one of said members and extending into the path of the other member to provide for the transmission of movement to the driven member, a trip member retaining said trippable abutment in its operative position, and means for releasing said trip member from said trippable abutment so as to release the driven member from the traveling power transmission member.

4. The combination with a typewriting machine having digit keys and a platen carriage, of calculating mechanism comprising an accumulator provided with total wheels and a traveling carriage movable step by step to provide for the transmission of movement to the different total wheels, accumulator operating means including devices whereby motion is transmitted from said digit keys to impart rotary motion to the total wheels, and feeding devices whereby motion is transmitted from said platen carriage to said traveling carriage so as to advance the latter step by step, said feeding devices comprising a traveling power transmission member carried by said platen carriage, a driven member through which movement is transmitted to said traveling carriage, one of said members being provided with an abutment extending into the path of the other member to provide for the transmission of movement to the driven member, and said abutment being elongated to permit the platen carriage to be shifted vertically without releasing said traveling power transmission member from said driven member, and a tripping device whereby the elongated abutment is tripped to release said traveling power transmission member from the driven member.

5. The combination with a typewriting machine having digit keys and a platen carriage, of calculating mechanism comprising an accumulator provided with total wheels and a traveling carriage movable step by step to provide for the transmission of movement to the different total wheels, accumulator operating means including devices whereby motion is transmitted from said digit keys to impart rotary motion to the total wheels, and feeding devices whereby motion is transmitted from said platen carriage to said traveling carriage so as to advance the latter step by step, said feeding devices comprising a traveling power transmission member carried by said platen carriage, an oscillatory driven member through which motion is transmitted to said traveling carriage, a trippable abutment carried by said oscillatory driven member and extending into the path of said traveling power transmission member to provide for the transmission of movement to said oscillatory driven member, said trippable abutment having an abutment face engaged by said traveling power transmission member and said abutment face being elongated to permit the platen carriage to be shifted vertically without releasing the oscillatory driven member, and a tripping device whereby said abutment is tripped to release said oscillatory driven member from said traveling power transmission member.

6. The combination with a typewriting machine having digit keys and a platen carriage, of calculating mechanism comprising an accumulator provided with total wheels and a traveling carriage movable step by step to provide for the transmission of movement to the different total wheels, accumulator operating means including devices whereby motion is transmitted from said digit keys to impart rotary motion to the total wheels, and feeding devices whereby motion is transmitted from said platen carriage to said traveling carriage so as to advance the latter step by step, said feeding devices comprising a traveling power transmission member carried by said platen carriage, an oscillatory driven member through which motion is transmitted to said traveling carriage, a trippable abutment carried by said oscillatory driven member and extending into the path of said traveling power transmission member to provide for the transmission of movement to said oscillatory driven member, said trippable abutment having an abutment face engaged by said traveling power transmission member and said abutment face being elongated to permit the platen carriage to be shifted vertically without releasing the oscillatory driven member, a tripping device whereby said abutment is tripped to release said oscillatory driven member from said traveling power transmission member, and a spring for restoring said oscillatory driven member.

7. The combination with a typewriting machine having digit keys and a platen carriage, of calculating mechanism comprising an accumulator provided with total wheels and a traveling carriage movable step by step to provide for the transmission of movement to the different total wheels, accumulator operating means including devices whereby motion is transmitted from said digit keys to impart rotary motion to the total wheels, and feeding devices whereby motion is transmitted from said platen carriage to said traveling carriage so as to advance the latter step by step, said feeding devices comprising a traveling power transmission member carried by said platen carriage, an oscillatory driven lever through which motion is transmitted to said traveling carriage, an elongated trippable abutment finger pivoted to said driven lever and extending into the path of said traveling power transmission member to provide for the transmission of power to said driven lever, a spring tending to retain said elongated abutment finger in the path of said traveling power transmission member, a trip member engaged by said elongated abutment finger to positively retain the latter in said path, means for releasing said trip member from said abutment finger so as to release said oscillatory driven lever from said traveling power transmission member, and a spring for restoring said oscillatory driven lever.

8. The combination with a typewriting machine having digit keys and a platen carriage, of calculating mechanism comprising an accumulator provided with total wheels and a traveling carriage movable step by step to provide for the transmission of movement to the different total wheels, accumulator operating means including devices whereby motion is transmitted from said digit keys to impart rotary motion to the total wheels, and feeding devices whereby motion is transmitted from said platen carriage to said traveling carriage so as to advance the latter step by step, said feeding devices comprising a traveling power transmission member carried by said platen carriage, a driven member through which movement is transmitted to said traveling carriage, one of said members having oppositely disposed abutments separated from each other to receive the other member, one of said abutments being normally located in the path of the last mentioned member, and the other abutment being normally located beyond said path, and means for shifting the last mentioned abutment into said path to provide for the transmission of movement in opposite directions from said traveling power transmission member to said driven member.

9. The combination with a typewriting machine having digit keys and a platen carriage, of calculating mechanism comprising an accumulator provided with total wheels and a traveling carriage movable step by step to provide for the transmission of movement to the different total wheels, accumulator operating means including devices whereby motion is transmitted from said digit keys to impart rotary motion to the total wheels, and feeding devices whereby motion is transmitted from said platen carriage to said traveling carriage so as to advance the latter step by step, said feeding devices comprising a traveling power transmission member carried by said platen carriage, an oscillatory driven member through which movement is transmitted to said traveling carriage, said oscillatory driven member having oppositely disposed abutments separated from each other to receive the said traveling power transmission member, thereby providing for the transmission of movement to said driven member, one of said abutments being normally located in the path of said traveling power transmission member and the other abutment being normally located beyond said path, and means for shifting the last mentioned abutment into said path so as to confine said traveling power transmission member between said abutments.

10. The combination with a typewriting machine having digit keys and a platen carriage, of calculating mechanism comprising an accumulator provided with total wheels and a traveling carriage movable step by step to provide for the transmission of movement to the different total wheels, accumulator operating means including devices whereby motion is transmitted from said digit keys to impart rotary motion to the total wheels, and feeding devices whereby motion is transmitted from said platen carriage to said traveling carriage so as to advance the latter step by step, said feeding devices comprising a traveling power transmission member carried by said platen carriage, an oscillatory driven lever through which movement is transmitted to said traveling carriage, said oscillatory driven lever being provided with a pair of oppositely disposed abutments separated from each other to receive said traveling power transmission member, one of said abutments being normally located in the path of said traveling power transmission member and the other abutment being normally located beyond said path so as to permit said traveling power transmission member to enter the space between said abutments, and a restoring spring whereby said oscillatory driven lever is restored when the traveling power transmission member passes from said abutments.

11. The combination with a typewriting machine having digit keys and a platen carriage, of calculating mechanism comprising an accumulator provided with total wheels and a traveling carriage movable step by step to provide for the transmission of movement to the different total wheels, accumulator operating means including devices whereby motion is transmitted from said digit keys to impart rotary motion to the total wheels, and feeding devices whereby motion is transmitted from said platen carriage to said traveling carriage so as to advance the latter step by step, said feeding devices comprising a traveling power transmission member carried by said platen carriage, a driven member through which movement is transmitted to said traveling carriage, and an abutment pivoted to one of said members and extending into the path of the other member to provide for the transmission of movement to said driven member, the pivoted abutment being free to move idly in one direction so as to permit the platen carriage to travel in one direction without transmitting movement to said driven member.

12. The combination with a typewriting machine having digit keys and a platen carriage, of calculating mechanism comprising an accumulator provided with total wheels and a traveling carriage movable step by step to provide for the transmission of movement to the different total wheels, accumulator operating means including devices whereby motion is transmitted from said digit keys to impart rotary motion to the total wheels, and feeding devices whereby motion is transmitted from said platen carriage to said traveling carriage so as to advance the latter step by step, said feeding devices comprising a traveling power transmission member carried by said platen carriage, an oscillatory driven member through which movement is transmitted to said traveling carriage, an abutment finger pivoted to said oscillatory driven member and extending into the path of said traveling power transmission member, the pivoted abutment finger being free to move idly in one direction so as to permit the platen carriage to travel in one direction without actuating said driven member, and a restoring spring whereby said oscillatory driven member is yieldingly held in its normal position, said pivoted abutment finger being located in said path when the driven member occupies its normal position.

13. The combination with a typewriting machine having digit keys and a platen carriage, of calculating mechanism comprising an accumulator provided with total wheels and a traveling carriage movable step by step to provide for the transmission of movement to the different total wheels, accumulator operating means including devices whereby motion is transmitted from said digit keys to impart rotary motion to the total wheels, and feeding devices whereby motion is transmitted from said platen carriage to said traveling carriage so as to advance the latter step by step, said feeding devices comprising an adjustable traveling power transmission pin carried by and detachably secured to said platen carriage, an oscillatory driven lever having gear teeth through which motion is transmitted to said traveling carriage, an elongated trippable abutment finger pivoted to said driven lever and extending into the path of said traveling power transmission pin, a trip lever pivoted to said driven lever and adapted to be engaged by said elongated trippable abutment finger, a second abutment finger pivoted to said driven lever and normally located beyond the path of said power transmission pin, an actuating lever pivoted to said driven lever to move said second abutment finger into and out of the path of said power transmission pin, yielding means tending to move said actuating lever so as to shift the second abutment finger into the path of said power transmission pin and also tending to retain said trip lever in the path of said elongated trippable abutment finger, a relatively stationary abutment member engaged by said actuating lever to permit said second abutment finger to move into the path of said power transmission pin, the abutment faces of said abutment fingers being oppositely disposed to form a space wherein said power transmission pin is closely confined so as to transmit movement in opposite directions to said driven lever, a relatively stationary abutment engaged by said trip lever to release said elongated trippable abutment finger, thereby allowing said platen carriage to continue in motion without actuating said oscillatory driven lever, and a spring tending to restore said driven lever.

14. The combination with a typewriting machine having digit keys and a platen carriage, of calculating mechanism comprising an accumulator provided with total wheels and a traveling carriage movable step by step to provide for the transmission of movement to the different total wheels, accumulator operating means including devices whereby motion is transmitted from said digit keys to impart rotary motion to the total wheels, and feeding devices whereby motion is transmitted from said platen carriage to said traveling carriage so as to advance the latter step by step, said feeding devices comprising a traveling power transmission member carried by said platen carriage, a driven member through which motion is transmitted to said traveling carriage, an intermediate member through which motion is transmitted from said traveling power transmission member to said driven member, and means for rendering said intermediate member inoperative to prevent the transmission of movement from said traveling power transmission member to said driven member.

15. The combination with a typewriting machine having digit keys and a platen carriage, of calculating mechanism comprising an accumulator provided with total wheels and a traveling carriage movable step by step to provide for the transmission of movement to the different total wheels, accumulator operating means including devices whereby motion is transmitted from said digit keys to impart rotary motion to the total wheels, and feeding devices whereby motion is transmitted from said platen carriage to said traveling carriage so as to advance the latter step by step, said feeding devices comprising a traveling power transmission member carried by said platen carriage, a driven member through which motion is transmitted to said platen carriage, an intermediate member through which motion is transmitted from said traveling power transmission member to said driven member, said intermediate member being shiftable to an inoperative position wherein it cannot transmit movement from said traveling power transmission member to said driven member, and means for retaining said intermediate member in its inoperative position.

16. The combination with a typewriting machine having digit keys and a platen carriage, of calculating mechanism comprising an accumulator provided with total wheels and a traveling carriage movable step by step to provide for the transmission of movement to the different total wheels, accumulator operating means including devices whereby motion is transmitted from said digit keys to impart rotary motion to the total wheels, and feeding devices whereby motion is transmitted from said platen carriage to said traveling carriage so as to advance the latter step by step, said feeding devices comprising a traveling power transmission member carried by said platen carriage, a driven member through which motion is transmitted to said traveling carriage, an intermediate member through which motion is transmitted from said traveling power transmission member to said driven member, said intermediate member being shiftable to an inoperative position wherein it cannot transmit movement from said traveling power transmission member to said driven member, and a latch device whereby said intermediate member is held in its inoperative position.

17. The combination with a typewriting machine having digit keys and a platen carriage, of calculating mechanism comprising an accumulator provided with total wheels and a traveling carriage movable step by step to provide for the transmission of movement to the different total wheels, accumulator operating means including devices whereby motion is transmitted from said digit keys to impart rotary motion to the total wheels, and feeding devices whereby motion is transmitted from said platen carriage to said traveling carriage, so as to advance the latter step by step, said feeding devices comprising a traveling power transmission member carried by said platen carriage, a driven member through which motion is transmitted to said traveling carriage, an abutment carried by one of said members and arranged in the path of the other member to provide for the transmission of movement to the driven member, said abutment being shiftable to an inoperative position beyond said path so as to allow the platen carriage to travel independently of said traveling carriage.

18. The combination with a typewriting machine having digit keys and a platen carriage, of calculating mechanism comprising an accumulator provided with total wheels and a traveling carriage movable step by step to provide for the transmission of movement to the different total wheels, accumulator operating means including devices whereby motion is transmitted from said digit keys to impart rotary motion to the total wheels, and feeding devices whereby motion is transmitted from said platen carriage to said traveling carriage so as to advance the latter step by step, said feeding devices comprising a traveling power transmission member carried by said platen carriage, a driven member through which motion is transmitted to said traveling carriage, an abutment carried by one of said members and arranged in the path of the other member to provide for the transmission of movement to the driven member, said abutment being shiftable to an inoperative position beyond said path so as to allow the platen carriage to travel independently of said traveling carriage, and means for retaining said abutment in its inoperative position.

19. The combination with a typewriting machine having digit keys and a platen carriage, of calculating mechanism comprising an accumulator provided with total wheels and a traveling carriage movable step by step to provide for the transmission of movement to the different total wheels, accumulator operating means including devices whereby motion is transmitted from said digit keys to impart rotary motion to the total wheels, and feeding devices whereby motion is transmitted from said platen carriage to said traveling carriage so as to advance the latter step by step, said feeding devices comprising a traveling power transmission member carried by said platen carriage, a driven member through which motion is transmitted to said traveling carriage, an abutment carried by one of said members and arranged in the path of the other member to provide for the transmission of movement to the driven member, said abutment being shiftable to an inoperative position beyond said path so as to allow the platen carriage to travel independently of said traveling carriage, and a latch device coöperable with said abutment to retain the latter in its inoperative position.

20. The combination with a typewriting machine having digit keys and a platen carriage, of calculating mechanism comprising an accumulator provided with total wheels and a traveling carriage movable step by step to provide for the transmission of movement to the different total wheels, accumulator operating means including devices whereby motion is transmitted from said digit keys to impart rotary motion to the total wheels, and feeding devices whereby motion is transmitted from said platen carriage to said traveling carriage so as to advance the latter step by step, said feeding devices comprising a traveling power transmission member carried by said platen carriage, a driven member through which motion is transmitted to said traveling carriage, an abutment pivoted to said driven member and extending into the path of said traveling power transmission member to provide for the transmission of movement to said driven member, the pivoted abutment being movable to an inoperative position beyond said path, and means for retaining said pivoted abutment in its inoperative position.

21. The combination with a typewriting machine having digit keys and a platen carriage, of calculating mechanism comprising an accumulator provided with total wheels and a traveling carriage movable step by step to provide for the transmission of movement to the different total wheels, accumulator operating means including devices whereby motion is transmitted from said digit keys to impart rotary motion to the total wheels, and feeding devices whereby motion is transmitted from said platen carriage to said traveling carriage so as to advance the latter step by step, said feeding devices comprising a traveling power transmission member carried by said platen carriage, a driven member through which motion is transmitted to said traveling carriage, an abutment pivoted to said driven member and extending into the path of said traveling power transmission member to provide for the transmission of movement to said driven member, the pivoted abutment being movable to an inoperative position beyond said path, and means for retaining said pivoted abutment in its inoperative position, the last mentioned means comprising a latch member carried by said driven member and coöperable with said pivoted abutment.

22. The combination with a typewriting machine having digit keys and a platen carriage, of calculating mechanism comprising an accumulator provided with total wheels and a traveling carriage movable step by step to provide for the transmission of movement to the different total wheels, accumulator operating means including devices whereby motion is transmitted from said digit keys to impart rotary motion to the total wheels, and feeding devices whereby motion is transmitted from said platen carriage to said traveling carriage so as to advance the latter step by step, said feeding devices comprising a traveling power transmission member carried by and extending from said platen carriage, an oscillatory driven lever through which motion is transmitted to said traveling carriage, an abutment finger pivoted to said oscillatory driven lever and extending into the path of said traveling power transmission member to provide for the transmission of power to the driven lever, the pivoted abutment finger being movable about its axis to an inoperative position wherein it lies entirely beyond the path of said traveling power transmission member, and a latch finger cooperable with said pivoted abutment finger to retain the latter in said inoperative position.

23. The combination with a typewriting machine having digit keys and a platen carriage, of calculating mechanism comprising an accumulator provided with total wheels and a traveling carriage movable step by step to provide for the transmission of movement to the different total wheels, accumulator operating means including connectors whereby motion is transmitted from said digit keys to impart rotary motion to the total wheels and means for transmitting motion from said platen carriage to said traveling carriage, the last mentioned means being provided with an oscillatory shaft actuated by the platen carriage; an oscillatory cam secured to said shaft, a lever actuated by said cam, and means for transmitting movement from the cam actuated lever to said connectors so as to connect the digit keys to the calculating mechanism.

24. The combination with a typewriting machine having digit keys and a platen carriage, of calculating mechanism comprising an accumulator provided with total wheels and a traveling carriage movable step by step to provide for the transmission of movement to the different total wheels, accumulator operating means including connectors whereby motion is transmitted from said digit keys to impart rotary motion to the total wheels and means for transmitting motion from said platen carriage to said traveling carriage, the last mentioned means being provided with an oscillatory shaft actuated by the platen carriage; an oscillatory cam secured to said shaft, a lever actuated by said cam, means for transmitting movement from the cam actuated lever to said connectors so as to connect the digit keys to the calculating mechanism, and shifting means under the control of the operator whereby the cam engaging portion of said lever is shifted to a position beyond the path of said cam.

25. The combination with a typewriting machine having digit keys and a platen carriage, of calculating mechanism comprising an accumulator provided with total wheels and a traveling carriage movable step by step to provide for the transmission of movement to the different total wheels, accumulator operating means including connectors whereby motion is transmitted from said digit keys to impart rotary motion to the total wheels and means for transmitting motion from said platen carriage to said traveling carriage, the last mentioned means being provided with an oscillatory shaft actuated by the platen carriage; an oscillatory cam secured to said shaft, a lever actuated by said cam, means for transmitting movement from the cam actuated lever to said connectors so as to connect the digit keys to the calculating mechanism, and a shifter to which said cam actuated lever is pivoted, said shifter being independent of the digit keys and platen carriage and being movable by the operator to prevent the cam actuated lever from being driven by said cam.

26. The combination with a typewriting machine having digit keys and a platen carriage, of calculating mechanism comprising an accumulator provided with total wheels and a traveling carriage movable step by step to provide for the transmission of movement to the different total wheels, accumulator operating means including connectors whereby motion is transmitted from said digit keys to impart rotary motion to the total wheels and means for transmitting motion from said platen carriage to said traveling carriage, the last mentioned means being provided with connector actuating devices including a lever through which motion is transmitted to said connectors so as to connect the digit keys to the calculating mechanism, a pivotal support for said lever, and a hand operated shifter whereby said pivotal support is shifted to place said lever in an inoperative position.

27. The combination with a typewriting machine having digit keys and a platen carriage, of calculating mechanism comprising an accumulator provided with total wheels and a traveling carriage movable step by step to provide for the transmission of movement to the different total wheels, accumulator operating means including connectors whereby motion is transmitted from said digit keys to impart rotary motion to the total wheels and means for transmitting motion from said platen carriage to said traveling carriage, the last mentioned means being provided with an oscillatory shaft actuated by the platen carriage; an oscillatory cam secured to said shaft, a lever actuated by said cam, means for transmitting movement from the cam actuated lever to said connectors so as to connect the digit keys to the calculating mechanism, shifting means under the control of the operator whereby the cam engaging portion of said lever is shifted to a position beyond the path of said cam, said shifting means including a shift lever under the control of the operator, and a detent whereby said shift lever is yieldingly held in its operative position.

28. The combination with a typewriting machine having digit keys and a platen carriage, of calculating mechanism comprising an accumulator provided with total wheels and a traveling carriage movable step by step to provide for the transmission of movement to the different total wheels, accumulator operating means including connectors whereby motion is transmitted from said digit keys to impart rotary motion to the total wheels and means for transmitting motion from said platen carriage to said traveling carriage, the last mentioned means including an oscillatory shaft through which the motion is transmitted, and connector operating devices including an oscillatory segmental cam driven by said oscillatory shaft, said cam having an arcuate face concentric with its axis and a nonconcentric face at one end of said arcuate face, a cam actuated lever adapted to be engaged by said faces of the cam, means for transmitting movement from said cam actuated lever to said connectors so as to connect the digit keys to the calculating mechanism, and yielding means whereby said connectors are disconnected when said cam passes from said cam actuated lever.

29. The combination with a typewriting machine having a platen carriage and digit keys, of calculating mechanism comprising an accumulator provided with total wheels actuated by said digit keys and a traveling carriage movable step by step to provide for the transmission of movement to the different total wheels, means for transmitting movement from said platen carriage to said traveling carriage, said means being provided with a toothed locking member adapted to be locked to prevent the transmission of movement to said carriages, locking dogs cooperating with each other to lock said toothed locking member during the operative stroke of the selected digit key, and key controlled unlocking means whereby said dogs are unlocked after the key has completed its operative stroke.

30. The combination with a typewriting machine having a platen carriage and digit keys, of calculating mechanism comprising an accumulator provided with total wheels actuated by said digit keys and a traveling carriage movable step by step to provide for the transmission of movement to the different total wheels, means for transmitting movement from said platen carriage to said traveling carriage, said means being provided with a toothed locking member adapted to be locked to prevent the transmission of movement to said carriages, locking dogs cooperable with each other to lock said toothed locking member, and key controlled means whereby said locking dogs are locked and unlocked in response to the movements of the digit keys.

31. The combination with a typewriting machine having a platen carriage and digit keys, of calculating mechanism comprising an accumulator provided with total wheels actuated by said digit keys and a traveling carriage movable step by step to provide for the transmission of movement to the different total wheels, means for transmitting movement from said platen carriage to said traveling carriage, said means being provided with a toothed locking member adapted to be locked to prevent the transmission of movement to said carriages, locking dogs cooperable with each other to lock said toothed locking member, and key controlled means whereby said locking dogs are locked and unlocked in response to the movements of the digit keys, said key controlled means including a spring tending to move one of said locking dogs to its operative position, an abutment whereby the last mentioned locking dog is normally held in an inoperative position, a device whereby said abutment is displaced at the beginning of the key operation, and means for restoring said abutment and locking dog.

32. The combination with a typewriting machine having a platen carriage and digit keys, of calculating mechanism comprising an accumulator provided with total wheels actuated by said digit keys and a traveling carriage movable step by step to provide for the transmission of movement to the different total wheels, means for transmitting movement from said platen carriage to said traveling carriage, said means being provided with a toothed locking member adapted to be locked to prevent the transmission of movement to said carriages, locking dogs cooperable with each other to lock said toothed locking member, and key controlled means whereby said locking dogs are locked and unlocked in response to the movements of the digit keys, said key controlled means including an oscillatory key actuated operating arm whereby one of said locking dogs is moved into and out of engagement with said toothed locking member.

33. The combination with a typewriting machine having a platen carriage and digit keys, of calculating mechanism comprising an accumulator provided with total wheels actuated by said digit keys and a traveling carriage movable step by step to provide for the transmission of movement to the different total wheels, means for transmitting movement from said platen carriage to said traveling carriage, said means being provided with a toothed locking member adapted to be locked to prevent the transmission of movement to said carriages, locking dogs cooperable with each other to lock said toothed locking member, and key controlled means whereby said locking dogs are locked and unlocked in response to the movements of the digit keys, said key controlled means including an oscillatory key actuated operating arm whereby one of said locking dogs is moved into and out of engagement with said toothed locking member, and a spring whereby the other locking dog is thrown to its operative position at the beginning of the key operation.

34. The combination with a typewriting machine having a platen carriage and digit keys, of calculating mechanism comprising an accumulator provided with total wheels actuated by said digit keys and a traveling carriage movable step by step to provide for the transmission of movement to the different total wheels, means for transmitting movement from said platen carriage to said traveling carriage, said means being provided with a toothed locking member adapted to be locked to prevent the transmission of movement to said carriages, a locking dog coöperable with said toothed locking member, a spring tending to move said locking dog to its operative position, an abutment normally retaining said dog in its inoperative position, key controlled means whereby said abutment is displaced at the beginning of a key operation, and key actuated means for restoring said locking dog.

35. The combination with a typewriting machine having digit keys and a platen carriage, of calculating mechanism comprising an accumulator provided with total wheels actuated by the downward strokes of said digit keys and a traveling carriage movable step by step to provide for the transmission of movement to the different total wheels, means for transmitting movement from said platen carriage to said traveling carriage, said means including a rock shaft driven in one direction by said platen carriage; a toothed locking member fixed to said shaft and adapted to be locked to positively prevent the transmission of movement in either direction to either of said carriages, a pair of pivotally mounted locking dogs coöperable with said toothed locking member, a spring tending to move one of said locking dogs to its operative position, an oscillatory operating arm for moving the other locking dog to and from its operative position, key controlled means for actuating said oscillatory operating arm, and means for transmitting movement from the last mentioned locking dog to the other locking dog.

36. The combination with a typewriting machine having digit keys and a platen carriage, of calculating mechanism comprising an accumulator provided with total wheels actuated by the downward strokes of said digit keys and a traveling carriage movable step by step to provide for the transmission of movement to the different total wheels, means for transmitting movement from said platen carriage to said traveling carriage, said means including a rock shaft driven in one direction by said platen carriage; a toothed locking member fixed to said shaft and adapted to be locked to prevent the transmission of movement to either of said carriages, a spring actuated locking dog provided with a spring tending to move it into engagement with said toothed locking member, an abutment whereby said spring actuated locking dog is normally prevented from coöperating with said toothed locking member, key actuated means whereby said abutment is released at the beginning of each key operation, a second locking dog coöperable with said toothed locking member, an oscillatory key actuated operating arm whereby said second locking dog is engaged with said toothed locking member at the end of the downward stroke of the key, means for transmitting movement to said spring actuated locking dog to unlock it before the key completes its downward stroke, and means for returning said abutment to the path of said spring actuated dog.

37. A calculating machine having digit keys, an accumulator, means for transmitting movement from said digit keys to said accumulator, said means including an oscillatory drive gear actuated by the digit keys and a rotary driven gear actuated by said oscillatory drive gear, and a gear shifter under the control of said digit keys whereby one of said gears is disengaged from the other to prevent the transmission of an oscillatory movement to said rotary driven gear.

38. A calculating machine having digit keys, an accumulator, means for transmitting movement from said digit keys to said accumulator, said means including an oscillatory drive gear actuated by the digit keys and a rotary driven gear actuated by said oscillatory drive gear, a gear shifter under the control of said digit keys whereby one of said gears is disengaged from the other to prevent the transmission of an oscillatory movement to said rotary driven gear, and key controlled devices whereby the shiftable gear is retained in its inoperative position during the inoperative stroke of the selected key.

39. A calculating machine having digit keys, an accumulator, means for transmitting movement from said digit keys to said accumulator, said means including an oscillatory shaft driven by the digit keys, an oscillatory drive gear shiftable on said shaft and a rotary driven gear actuated by said oscillatory drive gear, and a gear shifter under the control of said digit keys whereby said oscillatory drive gear is disengaged from said rotary driven gear to prevent the transmission of an oscillatory movement to said rotary driven gear.

40. A calculating machine having digit keys, an accumulator, means for transmitting movement from said digit keys to said accumulator, said means including an oscillatory shaft provided with a series of digit wheels actuated by the respective digit keys, an oscillatory drive gear in the form of a sector splined to said oscillatory shaft and a rotary driven gear actuated by said oscillatory drive gear to transmit a rotary movement to the accumulator, a gear shifter movable to shift said oscillatory drive gear into and out of mesh with said rotary driven gear, and key controlled means whereby said gear shifter is actuated to disengage the gears at the end of the downward stroke of the selected digit key.

41. A calculating machine having digit keys, an accumulator, means for transmitting movement from said digit keys to said accumulator, said means including an oscillatory transmission member actuated by said digit keys, a rotary driven member actuated by said oscillatory transmission member, said oscillatory transmission member being shiftable from an operative position wherein it transmits power to said rotary driven member to an inoperative position wherein it turns independently of said rotary driven member, and key controlled devices including a device for shifting said oscillatory transmission member to and from its operative position and a retaining device whereby said oscillatory transmission member is positively held in its inoperative position during the inoperative stroke of the selected digit key.

42. A calculating machine having an accumulator, digit keys, means whereby movement is transmitted from said digit keys to said accumulator, said means including a toothed oscillatory drive member actuated by said digit keys and a toothed rotary driven member actuated by said toothed oscillatory drive member, and key controlled devices including a device for shifting one of said toothed members to an inoperative position to prevent the transmission of an oscillatory movement to said toothed rotary driven member and a key controlled locking device whereby the shifted toothed member is locked in its inoperative position during one of the strokes of the selected digit key.

43. A calculating machine having an accumulator, accumulator operating devices comprising digit keys, a toothed oscillatory drive member moving in response to movements of said digit keys and a toothed rotary driven member actuated by said toothed oscillatory drive member so as to transmit a rotary movement to the accumulator, a shifter whereby one of said toothed members is shifted into and out of mesh with the other so as to prevent the transmission of an oscillatory movement to said toothed rotary driven member, and a locking device whereby the shifted toothed member is positively held in an inoperative position when the oscillatory drive member turns in one direction.

44. A calculating machine having an accumulator, accumulator operating devices comprising digit keys, a toothed oscillatory drive member moving in response to movements of said digit keys and a toothed rotary driven member actuated by said toothed oscillatory drive member so as to transmit a rotary movement to the accumulator, a shifter whereby one of said toothed members is shifted into and out of mesh with the other so as to prevent the transmission of an oscillatory movement to said toothed rotary driven member, a locking device whereby the shifted toothed member is positively held in an inoperative position when the oscillatory drive member turns in one direction, said locking device comprising a locking dog which becomes effective when the shifted toothed member reaches its inoperative position, and an automatic unlocking device whereby said locking dog is unlocked before the shifted toothed member is restored to its operative position.

45. A calculating machine having an accumulator, digit keys, means whereby movement is transmitted from said digit keys to said accumulator, said means including a toothed oscillatory drive member actuated by said digit keys so as to turn in one direction in response to the operative stroke of the selected digit key and in opposite direction in response to the inoperative stroke of the key and a toothed rotary driven member actuated by said toothed oscillatory drive member, and key controlled devices including a device for shifting one of said toothed members to an inoperative position to prevent the transmission of an oscillatory movement to said toothed rotary driven member and a key controlled locking dog whereby the shifted toothed member is positively locked in its inoperative position during the inoperative stroke of the selected digit key.

46. A calculating machine having an accumulator, digit keys, means whereby movement is transmitted from said digit keys to said accumulator, said means including a toothed oscillatory drive member actuated by said digit keys so as to turn in one direction in response to the downward stroke of the selected digit key and in the opposite direction in response to the upward stroke of the key and a toothed rotary driven member actuated by said toothed oscillatory drive member, and key controlled devices including a device for shifting one of said toothed members to an inoperative position to prevent the transmission of movement to the rotary driven member during the upward stroke of the selected digit key, and a key controlled locking device whereby the shifted toothed member is positively locked in its inoperative position during the upward stroke of the selected digit key, said key controlled locking device comprising a locking dog which becomes effective at the end of the downward stroke of the key, and a key controlled unlocking device whereby said locking dog is unlocked to release the shifted toothed member when the selected digit key occupies an elevated position.

47. A calculating machine having an accumulator, digit keys, means whereby movement is transmitted from said digit keys to said accumulator, said means including a toothed oscillatory drive gear actuated by said digit keys so as to turn in one direction in response to the downward stroke of the selected digit key and in the opposite direction in response to the upward stroke of the key and a toothed rotary driven gear actuated by said toothed oscillatory drive gear; and key controlled devices including a gear shifter for shifting said oscillatory drive gear to an inoperative position to prevent the transmission of movement to said rotary driven gear during the upward stroke of the selected digit key, a key controlled locking device whereby the gear shifter and the shifted drive gear are locked during the upward stroke of the selected digit key, said key controlled locking device comprising a locking dog which becomes effective at the end of the downward stroke of the key, and a key controlled unlocking device whereby said locking dog is unlocked to release the shifter and the shifted toothed member when the selected digit key occupies an elevated position.

48. A calculating machine having digit keys, an accumulator, means for transmitting movement from said digit keys to said accumulator, said means including an oscillatory shaft provided with a series of digit wheels actuated by the respective digit keys so as to turn in one direction in response to the downward stroke of the selected digit key and in the opposite direction in response to the upward stroke of the key, an oscillatory drive gear splined to said oscillatory shaft and a rotary driven gear actuated by said oscillatory drive gear to transmit a rotary movement to the accumulator; and key controlled devices including a pivotally supported shifter for shifting said oscillatory drive gear to an operative position wherein it meshes with said rotary driven gear and to an inoperative position wherein it is disengaged from the rotary driven gear, an operating lever whereby said shifter is actuated to move said oscillatory drive gear to an inoperative position, and a key controlled locking device whereby said operating lever is positively locked to retain the shifted drive gear in its inoperative position during the upward stroke of the selected digit key, said key controlled locking device comprising a locking dog which coöperates with said operating lever at the end of the downward stroke of the key, and a key controlled unlocking device whereby said locking dog is unlocked to release said operating lever when the selected digit key occupies an elevated position.

49. A calculating machine having an accumulator, digit keys, means whereby movement is transmitted from said digit keys to said accumulator, said means including an oscillatory drive member actuated by said digit keys, said oscillatory drive member being movable in opposite directions in response to corresponding movements of the selected digit key, a ratchet and pawl preventing retrograde movement of said oscillatory drive member when the latter turns in one direction, and a key controlled shifter whereby one of the elements of said ratchet and pawl is shifted and rendered ineffective when the oscillatory drive member turns in the opposite direction.

50. A calculating machine having an accumulator, digit keys, means whereby movement is transmitted from said digit keys to said accumulator, said means including a toothed oscillatory drive member actuated by said digit keys so as to turn in one direction in response to the downward stroke of the selected digit key and in the opposite direction in response to the upward stroke of the key and a toothed rotary driven member actuated by said toothed oscillatory drive member, and key controlled devices including a device for shifting one of said toothed members to an inoperative position to prevent the transmission of movement to the rotary driven member during the upward stroke of the selected digit key, and a ratchet device preventing retrograde movement of said toothed oscillatory drive member during the upward stroke of the key so as to prevent the key from being again depressed before it reaches its elevated position, one of the elements of said ratchet device being movable with the shiftable toothed member so as to render the ratchet device ineffective when said toothed members are engaged with each other.

51. A calculating machine having digit keys, an accumulator, means for transmitting movement from said digit keys to said accumulator, said means including an oscillatory shaft driven by the digit keys, an oscillatory drive gear shiftable on said shaft and a rotary driven gear actuated by said oscillatory drive gear, a gear shifter under the control of said digit keys whereby said oscillatory drive gear is disengaged from said rotary driven gear to prevent the transmission of an oscillatory movement to said rotary driven gear, a shiftable oscillatory ratchet wheel moving with said oscillatory drive gear, and a pawl coöperating with said ratchet wheel to prevent retrograde movement of said oscillatory drive gear during the upward stroke of the selected digit key, said pawl being positioned to coöperate with the shiftable oscillatory ratchet wheel only when the oscillatory drive gear is disengaged from the rotary driven gear.

52. A calculating machine having an accumulator, digit keys, means whereby movement is transmitted from said digit keys to said accumulator, said means including an oscillatory drive member actuated by said digit keys, said oscillatory drive member being movable in opposite directions in response to corresponding movements of the selected digit key, a rotary driven member actuated by said oscillatory drive member, a key controlled shifter whereby said oscillatory drive member is shifted into and out of mesh with said rotary driven member, said oscillatory drive member being in mesh with the rotary driven member while the selected digit key is moving downwardly but not when the key is moving upwardly, a shiftable oscillatory ratchet wheel moving with the shiftable oscillatory drive member, and a relatively stationary pawl coöperating with said shiftable oscillatory ratchet wheel to prevent retrograde movement of the oscillatory drive member when the selected digit key is moving upwardly but not when said key is moving downwardly 53. A calculating machine having digit keys, an accumulator, means for transmitting movement from said digit keys to said accumulator, said means including racks secured to said digit keys, oscillatory digit wheels adapted to mesh with said racks, an oscillatory shaft to which said digit wheels are fixed, a shiftable oscillatory drive gear splined to said oscillatory shaft and a rotary driven gear adapted to mesh with said oscillatory drive gear; a shiftable oscillatory ratchet wheel fixed to said shiftable oscillatory drive gear, a pawl adapted to engage said shiftable oscillatory ratchet wheel, said shiftable oscillatory ratchet wheel being engaged with said pawl only when the shiftable oscillatory drive gear is disengaged from said rotary driven gear, and a key controlled shifter whereby said oscillatory drive gear and oscillatory ratchet wheel are shifted to engage the drive gear with the rotary driven gear during the downward stroke of the key and to disengage said gears during the upward stroke of the key, thereby engaging the ratchet wheel with the pawl during the upward stroke of the key.

54. The combination with a typewriting machine having digit keys and a platen carriage provided with a toothed bar, of calculating mechanism comprising an accumulator provided with a traveling carriage and adjustable means for transmitting movement from said platen carriage to said traveling carriage, said adjustable means comprising a power transmission clip having a pair of legs straddling and interlocked with said toothed bar, a spring actuated detent pivotally mounted on said clip and detachably securing the clip to said toothed bar, an operating finger extending from said detent, and a handle for the clip adjacent to said operating finger.

55. The combination with a typewriting machine having digit keys and a platen carriage provided with a toothed bar, of calculating mechanism comprising an accumulator provided with a traveling carriage and adjustable means for transmitting movement from said platen carriage to said traveling carriage, a U-shaped power transmission clip having a pair of legs straddling and interlocked with said toothed bar, a spring actuated detent pivotally mounted on said legs and having a tooth engaging the lower face of said toothed bar adjacent to the lower ends of said legs, a handle in the form of a ring at the upper portion of the clip, and a curved operating finger extending upwardly from said detent, said curved operating finger being eccentric to and adjacent to said handle.

In testimony that we claim the foregoing we hereunto affix our signatures.

EDWARD C. SCHINKE.
NORMAN A. SUTHERLAND.